United States Patent
Yang

(10) Patent No.: US 9,557,837 B2
(45) Date of Patent: Jan. 31, 2017

(54) TOUCH INPUT APPARATUS AND OPERATION METHOD THEREOF

(71) Applicant: PixArt Imaging Inc., Hsinchu (TW)

(72) Inventor: Shu-Sian Yang, Hsinchu (TW)

(73) Assignee: PIXART IMAGING INC., Hsinchu (TW)

( * ) Notice: Subject to any disclaimer, the term of this patent is extended or adjusted under 35 U.S.C. 154(b) by 133 days.

(21) Appl. No.: 13/675,019

(22) Filed: Nov. 13, 2012

(65) Prior Publication Data

US 2013/0069900 A1 Mar. 21, 2013

Related U.S. Application Data

(63) Continuation-in-part of application No. 12/888,783, filed on Sep. 23, 2010, now Pat. No. 8,884,911.

(30) Foreign Application Priority Data

Jun. 15, 2010 (TW) .............. 99119560 A
Nov. 17, 2011 (TW) .............. 100142082 A

(51) Int. Cl.
*G06F 3/045* (2006.01)
*G06F 3/041* (2006.01)

(52) U.S. Cl.
CPC .............. *G06F 3/041* (2013.01); *G06F 3/045* (2013.01); *G06F 3/0416* (2013.01); *Y10S 977/742* (2013.01)

(58) Field of Classification Search
CPC .......................... G06F 3/045; Y10S 977/742

(Continued)

(56) References Cited

U.S. PATENT DOCUMENTS 6,498,602 B1 12/2002 Ogawa et al.
2005/0110766 A1* 5/2005 Kent et al. .............. 345/173

(Continued)

FOREIGN PATENT DOCUMENTS

CN 1774692 5/2006
CN 101354624 1/2009

(Continued)

OTHER PUBLICATIONS

Bushnell, M. et al., Essentials of Electronic Testing for Digital, Memory and Mixed Signal VLSI Circuits, Dec. 15, 2004, Springer, Frontiers in Elecrtonic Testing (Book 17), p. 98.*

*Primary Examiner* — Kwin Xie
(74) *Attorney, Agent, or Firm* — Chieh-Mei Wang

(57) ABSTRACT

This invention provides several touch input apparatuses and operating methods. One touch input apparatus includes two carbon nanotube (CNT) layers, a plurality of contact pads and a processing circuit. The CNTs of the two CNT layers are respectively disposed to two different arrangement directions. The contact pads are divided into two groups to electrically connect the edges of the two CNT layers respectively. Each group of the contact pads is arranged in a direction perpendicular to the arrangement direction of the corresponding carbon nanotubes. The processing circuit provides a comparison voltage to one group of the contact pads and reads out the voltages on the other contact pads. When one CNT layer receives an external force so that the forced position on one CNT layer is electrically connected to the other CNT layer, the processing circuit calculates the strength of the external force according to the readout voltage values.

29 Claims, 18 Drawing Sheets

(58) Field of Classification Search
USPC .................................................. 345/173–174
See application file for complete search history.

(56) References Cited

U.S. PATENT DOCUMENTS

| | | |
|---|---|---|
| 2006/0026535 A1 | 2/2006 | Hotelling et al. |
| 2006/0207806 A1* | 9/2006 | Philipp ................... G06F 3/045 178/18.05 |
| 2008/0117183 A1 | 5/2008 | Yu et al. |
| 2008/0122792 A1 | 5/2008 | Izadi et al. |
| 2009/0085888 A1 | 4/2009 | Ho |
| 2009/0128516 A1 | 5/2009 | Rimon et al. |
| 2009/0189877 A1 | 7/2009 | Washino et al. |
| 2009/0256817 A1* | 10/2009 | Perlin ................... G06F 3/0233 345/174 |
| 2009/0278794 A1 | 11/2009 | McReynolds et al. |
| 2010/0007625 A1* | 1/2010 | Jiang et al. ............... 345/173 |
| 2010/0097343 A1 | 4/2010 | Fang |
| 2010/0214231 A1* | 8/2010 | D'Souza et al. ........... 345/173 |
| 2010/0295816 A1 | 11/2010 | Zhang |
| 2010/0315361 A1 | 12/2010 | Wang et al. |
| 2010/0321337 A1 | 12/2010 | Liao et al. |
| 2011/0006981 A1 | 1/2011 | Chtchetinine et al. |
| 2011/0026038 A1 | 2/2011 | Kiyose |
| 2011/0069018 A1 | 3/2011 | Atkins et al. |
| 2011/0069037 A1 | 3/2011 | Su |
| 2011/0090176 A1 | 4/2011 | Christiansson et al. |
| 2011/0157096 A1 | 6/2011 | Drumm |
| 2011/0169736 A1 | 7/2011 | Bolt et al. |
| 2011/0169763 A1 | 7/2011 | Westerman et al. |
| 2011/0193777 A1 | 8/2011 | Zhou et al. |
| 2011/0205189 A1 | 8/2011 | Newton |
| 2012/0154324 A1 | 6/2012 | Wright et al. |
| 2012/0176345 A1 | 7/2012 | Ye et al. |
| 2012/0194467 A1* | 8/2012 | Huang et al. ................. 345/174 |
| 2012/0280929 A1 | 11/2012 | Rimon et al. |
| 2012/0318957 A1 | 12/2012 | Lai et al. |

FOREIGN PATENT DOCUMENTS

| | | |
|---|---|---|
| CN | 101581998 | 11/2009 |
| CN | 101963855 A | 2/2011 |
| CN | 102033660 | 4/2011 |
| CN | 102129336 A | 7/2011 |
| CN | 102622137 | 8/2012 |
| EP | 2278443 A2 | 1/2011 |
| TW | 200402649 A | 2/2004 |
| TW | 201044235 A | 12/2010 |
| TW | 201101134 A | 1/2011 |
| TW | 201106235 A | 2/2011 |
| TW | 201108055 A | 3/2011 |
| TW | 201112065 A | 4/2011 |
| TW | 201112092 | 4/2011 |
| TW | 201128479 | 8/2011 |
| TW | M411617 | 9/2011 |
| TW | 201142405 | 12/2011 |
| TW | 201250552 | 12/2012 |

* cited by examiner in a first period provide a first comparison voltage to the second contact pads, sequentially operate the first contact pads in a floating state according to a first predetermined order and simultaneously electrically connect the un-floating first contact pads to a first reference voltage so as to sequentially read the voltage values of the first contact pads operated in the floating state ～S902

TOUCH INPUT APPARATUS AND OPERATION METHOD THEREOF

CROSS-REFERENCE TO RELATED APPLICATIONS

This application is a continuation-in-part of U.S. application Ser. No. 12/888,783, filed on Sep. 23, 2010, and claims the priority benefit of Taiwan application Ser. 100142082, filed on Nov. 17, 2011. The entire contents of the above applications are incorporated herein by reference.

TECHNICAL FIELD

The present invention relates to a technology in a touch control field, and more particularly to a touch input apparatus and an operation method thereof using carbon nanotubes.

BACKGROUND

Most of the resistive touch panels, due to the restriction of structures, can only sense a single touch point's movement trajectory and touch strength. Despite some factories uses a number of small-sized single-touch resistive panels to integrate to one large-sized multi-touch panel, this approach may still have a poor yield rate and accordingly not be widely used.

In addition, although projected capacitive touch panels have a structure capable of supporting multi-touch, the projected capacitive touch panels still have some problems, due to the sensing method thereof is realized by sensing each touch point's small capacitance value, such as having relatively weak sensed signals and thereby being easily affected by noises. In addition, the projected capacitive touch panels cannot be operated by a pen or a pen-like object.

SUMMARY OF EMBODIMENTS

Therefore, one object of the present invention is to provide a plurality of touch input apparatuses adopting carbon nanotubes for the realization of multi-touch control.

Another object of the present invention is to provide a plurality of operation methods corresponding to the aforementioned touch input apparatuses.

The present invention provides a touch input apparatus, which includes a first carbon nanotube layer, a second carbon nanotube layer, a plurality of first contact pads, a plurality of second contact pads and a processing circuit. The carbon nanotubes of the first carbon nanotube layer are disposed to be roughly parallel to a first direction. The carbon nanotubes of the second carbon nanotube layer are disposed to be roughly parallel to a second direction, and the first and the second carbon nanotube layers have a predetermined distance therebetween. The first contact pads are electrically connected to an edge of the first carbon nanotube layer and arranged in a line perpendicular to the first direction. The second contact pads are electrically connected to an edge of the second carbon nanotube layer and arranged in a line perpendicular to the second direction. The processing circuit is electrically connected to the first and the second contact pads and configured to, in a first period, provide a first comparison voltage to the second contact pads, sequentially operate the first contact pads in a floating state according to a first predetermined order and simultaneously electrically connect the first contact pads not being operated in the floating state to a first reference voltage so as to sequentially read out voltage values of the first contact pads operated in the floating state. The processing circuit further is configured to, in a second period, provide a second comparison voltage to the first contact pads, sequentially operate the second contact pads in the floating state according to a second predetermined order and simultaneously electrically connect the second contact pads not being operated in the floating state to a second reference voltage so as to sequentially read out voltage values of the second contact pads operated in the floating state. The processing circuit further is configured to calculate an external force's strength according to the readout voltage values while the first carbon nanotube layer is being applied with the external force and thereby resulting in a corresponding forced point on the first carbon nanotube layer to electrically contact to the second carbon nanotube layer.

In an embodiment of the present invention, the processing circuit is further configured to calculate a plurality of external forces strengths according to the readout voltage values while the first carbon nanotube layer is being applied with the external forces and thereby resulting in corresponding forced points on the first carbon nanotube layer to electrically contact to the second carbon nanotube layer.

The present invention further provides an operation method of a touch input apparatus. The touch input apparatus includes a first carbon nanotube layer, a second carbon nanotube layer, a plurality of first contact pads and a plurality of second contact pads. The carbon nanotubes of the first carbon nanotube layer are disposed to be roughly parallel to a first direction. The carbon nanotubes of the second carbon nanotube layer are disposed to be roughly parallel to a second direction. The first and the second carbon nanotube layers have a predetermined distance therebetween. The first contact pads are electrically connected to an edge of the first carbon nanotube layer and arranged in a line perpendicular to the first direction. The second contact pads are electrically connected to an edge of the second carbon nanotube layer and arranged in a line perpendicular to the second direction. The operation method includes steps of: in a first period providing a first comparison voltage to the second contact pads, sequentially operating the first contact pads in a floating state according to a first predetermined order and simultaneously electrically connecting the first contact pads not being operated in the floating state to a first reference voltage so as to sequentially read out voltage values of the first contact pads operated in the floating state; in a second period providing a second comparison voltage to the first contact pads, sequentially operating the second contact pads in the floating state according to a second predetermined order and simultaneously electrically connecting the second contact pads not being operated in the floating state to a second reference voltage so as to sequentially read out voltage values of the second contact pads operated in the floating state; and calculating an external force's strength according to the readout voltage values while the first carbon nanotube layer is being applied with the external force and thereby resulting in a corresponding forced point on the first carbon nanotube layer to electrically contact to the second carbon nanotube layer.

In an embodiment of the present invention, the operation method further includes a step of: calculating a plurality of external forces strengths according to the readout voltage values while the first carbon nanotube layer is applied with the external forces and thereby resulting in corresponding forced points on the first carbon nanotube layer to electrically contact to the second carbon nanotube layer.

The present invention further provides a touch input apparatus, which includes a first carbon nanotube layer, a second carbon nanotube layer, a plurality of first contact pads, a plurality of second contact pads and a processing circuit. The carbon nanotubes of the first carbon nanotube layer are disposed to be roughly parallel to a first direction. The carbon nanotubes of the second carbon nanotube layer are disposed to be roughly parallel to a second direction. The first and the second carbon nanotube layers have a predetermined distance therebetween. The first contact pads are electrically connected to an edge of the first carbon nanotube layer and arranged in a line perpendicular to the first direction. The second contact pads are electrically connected to an edge of the second carbon nanotube layer and arranged in a line perpendicular to the second direction. The processing circuit is electrically connected to the first and the second contact pads and configured to, in a first period, provide a first comparison voltage to the second contact pads and read out voltage values of the first contact pads. The processing circuit further is configured to, in a second period, provide a second comparison voltage to the first contact pads and read out voltage values of the second contact pads. The processing circuit further is configured to calculate an external force's strength according to the readout voltage values while the first carbon nanotube layer is being applied with the external force and thereby resulting in a corresponding forced point on the first carbon nanotube layer to electrically contact to the second carbon nanotube layer.

In an embodiment of the present invention, the processing circuit is further configured to calculate a plurality of external forces strengths according to the readout voltage values while the first carbon nanotube layer is being applied with the external forces and thereby resulting in corresponding forced points on the first carbon nanotube layer to electrically contact to the second carbon nanotube layer.

The present invention further provides a touch input apparatus, which includes a carbon nanotube layer, an inductive layer, a plurality of contact pads and a processing circuit. The carbon nanotubes of the carbon nanotube layer are disposed to be roughly parallel to a predetermined direction. The inductive layer is disposed above or under the carbon nanotube layer. The carbon nanotube layer and the inductive layer have a predetermined distance therebetween. The contact pads are electrically connected to an edge of the carbon nanotube layer and arranged in a line perpendicular to the predetermined direction. The processing circuit is electrically connected to the contact pads and the inductive layer and configured to provide a comparison voltage to the inductive layer and read out voltage values of the contact pads. The processing circuit further is configured to calculate an external force's strength according to the readout voltage values while the carbon nanotube layer (or, the inductive layer), is being applied with the external force and thereby resulting in a corresponding forced point on the carbon nanotube layer (or, the inductive layer) to electrically contact to the inductive layer (or, the carbon nanotube layer).

In an embodiment of the present invention, the processing circuit is further configured to calculate a plurality of external forces strengths according to the readout voltage values while the carbon nanotube layer (or, the inductive layer) is being applied with the external forces and thereby resulting in corresponding forced points on the first carbon nanotube layer (or, the inductive layer) to electrically contact to the inductive layer (or, the carbon nanotube layer).

In summary, to solve the problems in prior art, the touch input apparatus according to the present invention can be either constituted by two carbon nanotube layers thereby being adapted to sense touch points' two-dimensional position, or constituted by one carbon nanotube layer and one inductive layer thereby being adapted to sense touch points' one-dimensional position. Specifically, in the architecture of having two carbon nanotube layers, because the carbon nanotubes of the two carbon nanotube layers are respectively arranged to two different directions, an edge of one carbon nanotube layer is supplied with a comparison voltage (for example, a power supply voltage) and a plurality of voltage values are read out from an edge of the other carbon nanotube layer, the touch input apparatus can firstly determine the touch point's position and then calculate, convert or estimate an external force's strength based on the anisotropic resistance characteristics and the readout voltage values while one carbon nanotube layer is applied with the external force thereby resulting in a corresponding forced point on the one carbon nanotube layer to electrically contact to the other carbon nanotube layer. In addition, the sensing signals corresponding to a plurality of touch points, due to the anisotropic resistance characteristics, can have a much smaller interference therebetween, so the touch input apparatus according to the present invention is adapted for the multi-touch control and is capable of sensing the touch points' two-dimensional position.

In the architecture of having one carbon nanotube layer and one inductive layer, because only the inductive layer is supplied with a comparison voltage and a plurality of voltage values are read out from an edge of the carbon nanotube layer, the touch input apparatus can firstly determine the touch point's position according to the anisotropic resistance characteristics and the readout voltage values and then calculate, convert or estimate an external force's strength according to the readout voltage values while the carbon nanotube layer (or, the conductive layer) is applied with the external force thereby resulting in a corresponding forced point to electrically contact to the conductive layer (or, the carbon nanotube layer). In addition, the sensing signals corresponding to a plurality of touch points, due to the anisotropic resistance characteristics, can have a much smaller interference therebetween, so the touch input apparatus according to the present invention is adapted for the multi-touch control and is capable of sensing the touch points' one-dimensional position.

BRIEF DESCRIPTION OF THE DRAWINGS

The above embodiments will become more readily apparent to those ordinarily skilled in the art after reviewing the following detailed description and accompanying drawings, in which:

FIGS. 9A, 9B are flow charts illustrating an operation method of a touch input apparatus in accordance with an embodiment of the invention.

DETAILED DESCRIPTION OF PREFERRED EMBODIMENTS

The disclosure will now be described more specifically with reference to the following embodiments. It is to be noted that the following descriptions of preferred embodiments are presented herein for purpose of illustration and description only. It is not intended to be exhaustive or to be limited to the precise form disclosed.

Further, in the following detailed description of the preferred embodiments, reference is made to the accompanying drawings which form a part hereof, and in which are shown by way of illustration specific embodiments in which the invention may be practiced. It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Accordingly, the descriptions will be regarded as illustrative in nature and not as restrictive.

Figure 1:
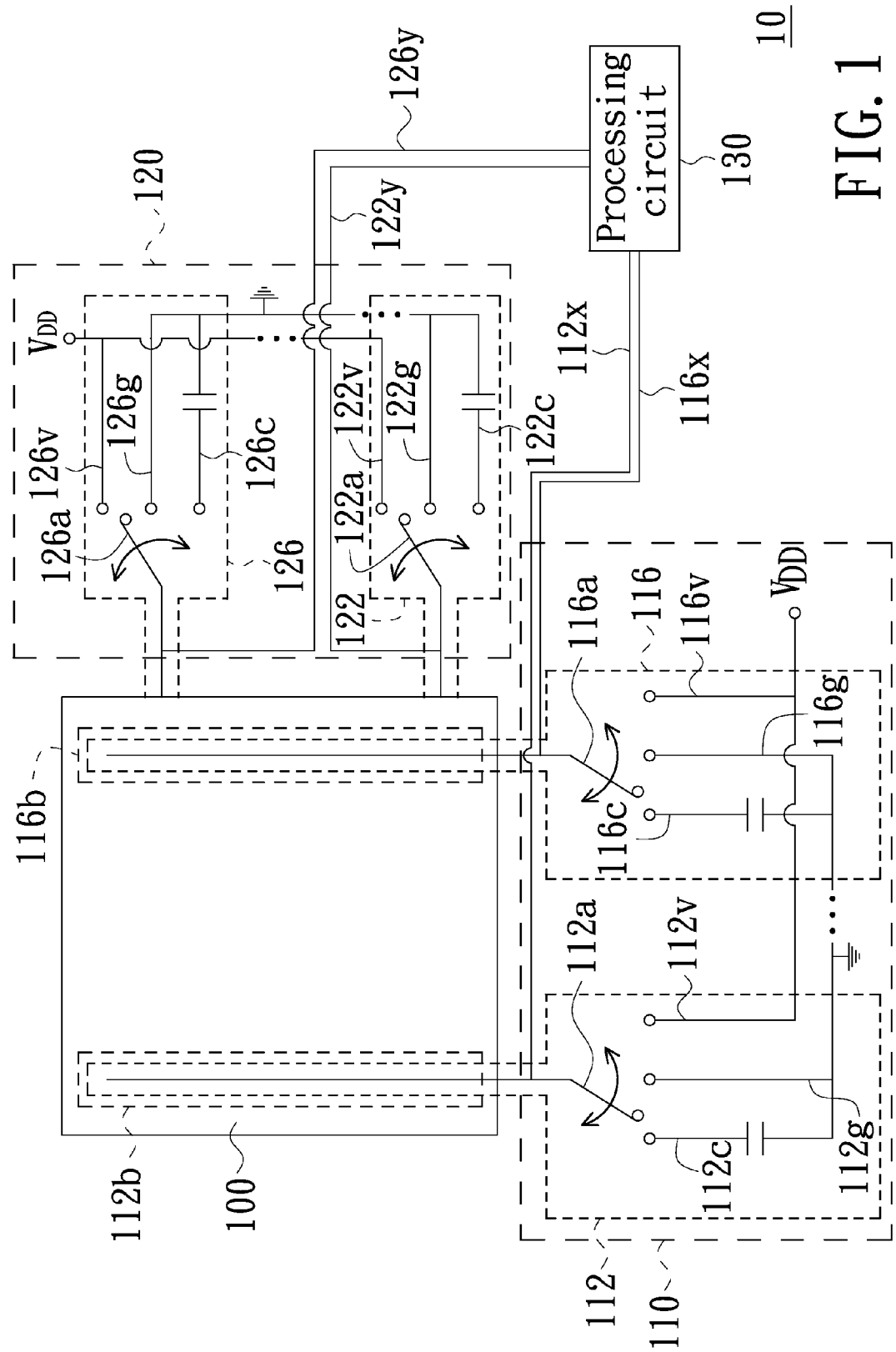
FIG. 1 shows a schematic circuit block diagram of an exemplary embodiment of a resistive touch controlling system.

Referring to FIG. 1, showing a schematic circuit block diagram of a resistive touch controlling system in accordance with an exemplary embodiment of the present invention. The resistive touch controlling system 10 includes a touch panel 100, a first sensing module 110, a second sensing module 120 and a processing circuit 130. However, the touch panel 100 is not a necessary component of the resistive touch controlling system 10. In other words, the resistive touch controlling system 10 can only include the circuits of the first sensing module 110, the second sensing module 120, the processing circuit 130 and so on, for generating touch sensing signals and processing these sensing signals.

In the embodiment as illustrated in FIG. 1, the first sensing module 110 and the second sensing module 120 include a plurality of sensing line groups such as sensing line groups 112, 116, 122, and 126. Each of the sensing line groups (e.g., the sensing line groups 112, 116, 122, and 126) includes a switch (e.g., the switch 112a, 116a, 122a, or 126a), a capacitor line (e.g., the capacitor line 112c, 116c, 122c, or 126c), a grounding line (e.g., the grounding line 112g, 116g, 122g, or 126g), and an input voltage level line (e.g., the input voltage level line 112v, 116v, 122v, or 126v). The capacitor line is further electrically coupled to a capacitor, the grounding line is further electrically coupled to a grounding voltage, and the input voltage level line is further electrically coupled to an input voltage VDD. The processing circuit 130 is electrically coupled to the first sensing module 110 and the second sensing module 120 respectively through lines 112x, 116x, 122y and 126y etc., and determines whether there is an object touching a corresponding sensing line group 112, 116, 122, or 126 according to the voltage obtained from the lines 112x, 116x, 122y, and 126y.

Generally speaking, before scanning whether there is an object touching the touch panel 100, the sensing line groups of the first sensing module 110 would be electrically coupled to the input voltage VDD, and the sensing line groups of the second sensing module 120 would be electrically coupled to the grounding voltage. When scanning the first sensing module 110, the sensing line groups (112, 116) would be electrically coupled to the corresponding capacitor lines (112c, 116c) in a manner of one by one, and the sensing line groups of the second sensing module 120 maintains at being electrically coupled to the grounding voltage. At this situation, the processing circuit 130 can detect the voltage level change of the corresponding sensing line group 112 through the line 112x, and determines whether there is an object touching the sensing area 112b corresponding to the sensing line group 112 of the touch panel 100 according to the detected voltage level change. Similarly, the processing circuit 130 also can detect a voltage level change of a corresponding sensing line group 116 through the line 116x, and determines whether there is an object touching the sensing area 116b corresponding to the sensing line group 116 of the touch panel 100 according to the detected voltage level change.

Similarly, when scanning the second sensing module 120, the operation mode is the same as the above-mentioned operation mode, and relevant description will not be repeated herein.

Figure 2A:
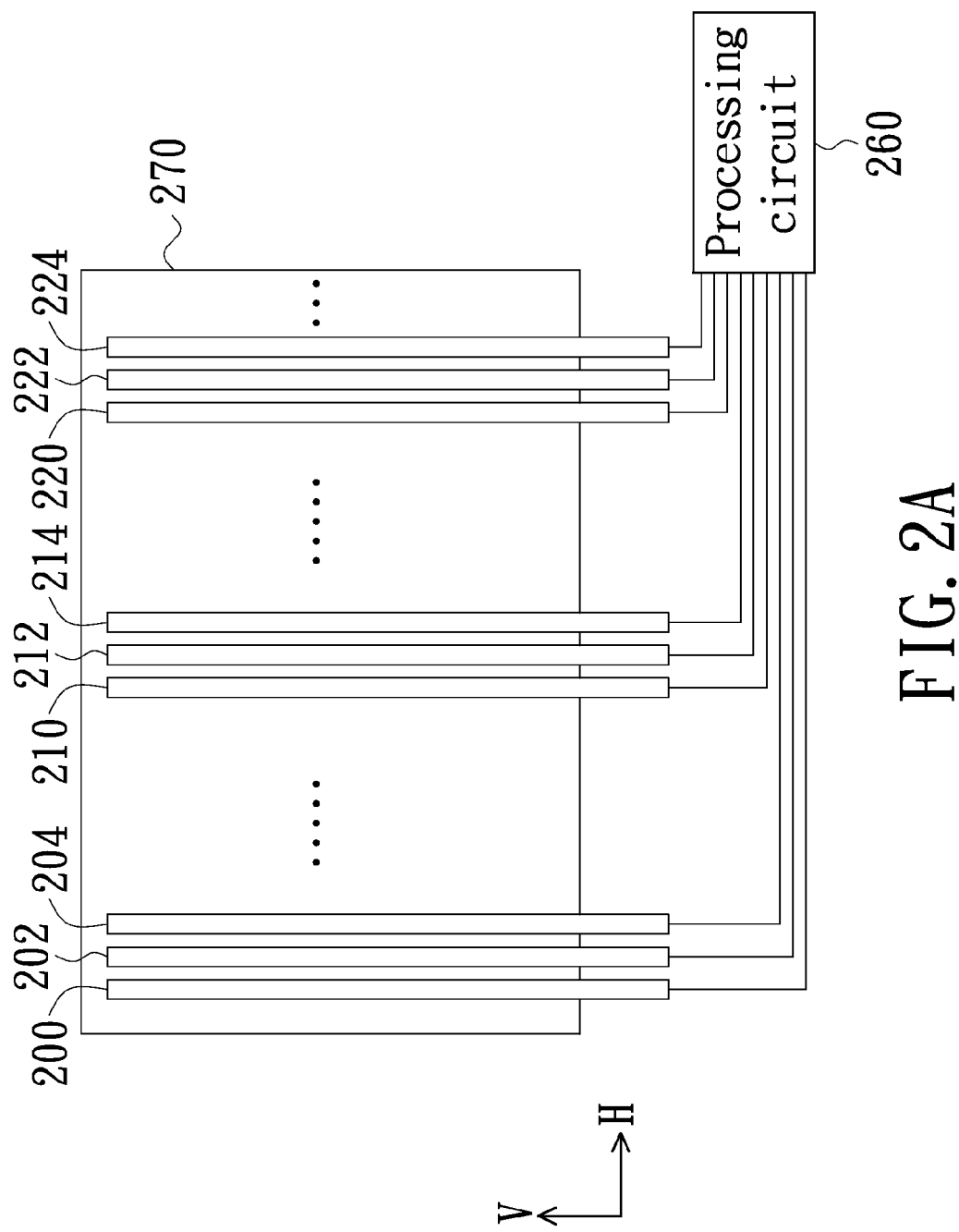
FIGS. 2A and 2B show schematic views of arrangement of sensing line groups in accordance with an exemplary embodiment.
Figure 2B:
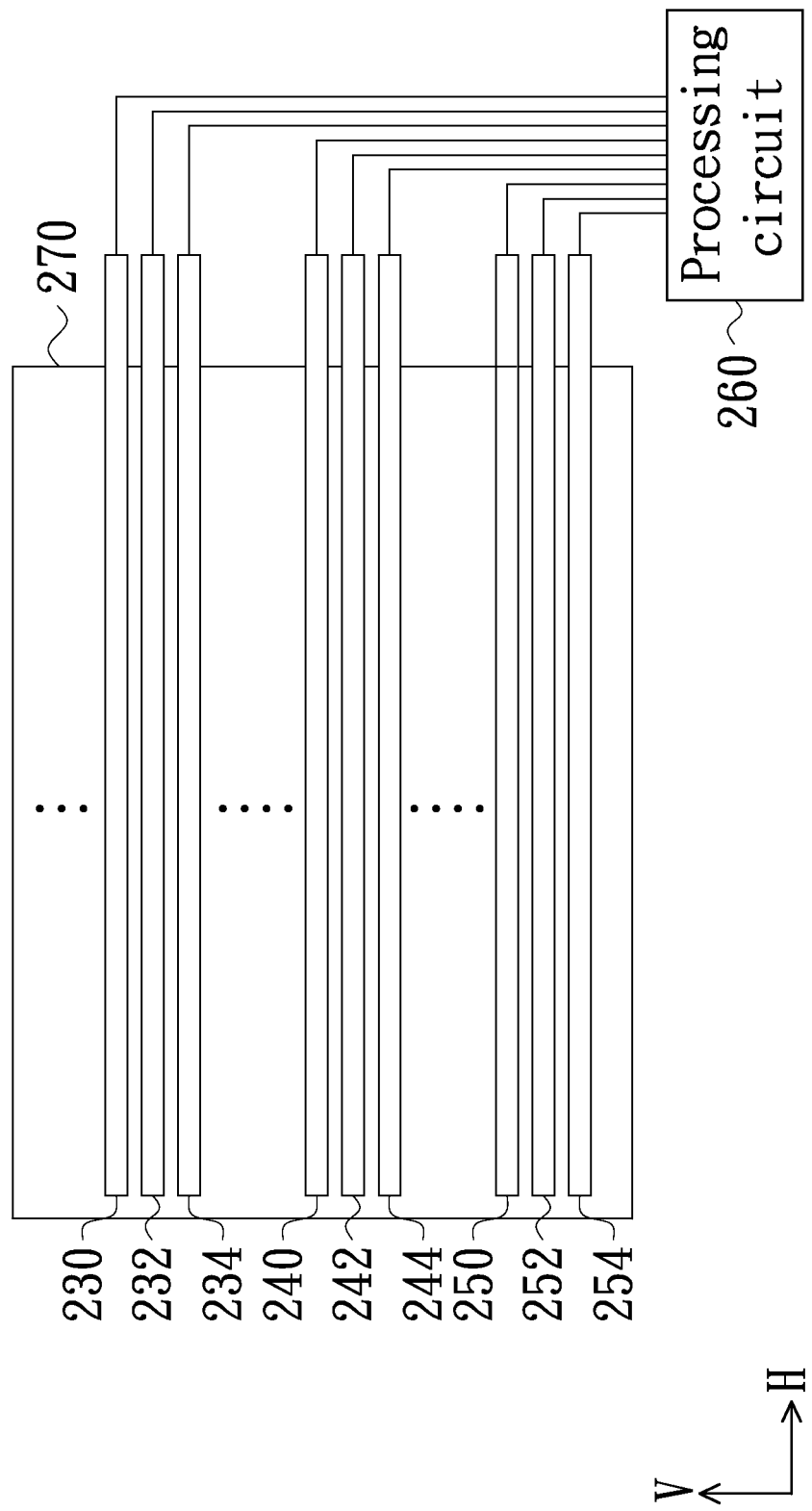

Subsequently, referring to FIG. 2A and FIG. 2B together, showing a schematic view of arrangement of sensing line groups in accordance with an embodiment of the invention. As shown in FIG. 2A, the sensing line groups 200-224 are arranged along a horizontal direction and vertically extending into the touch panel 270. Similarly, as shown in FIG. 2B, the sensing line groups 230~254 are arranged along the vertical direction and horizontally extending into the touch panel 270. Each of these sensing line groups corresponds to a sensing area (not shown) on the touch panel 270, as the same illustrated in FIG. 1. When scanning the sensing line groups arranged along a certain one direction, voltage levels of the sensing line groups must be sensed one by one. However, a scanning sequence of the sensing line groups can be changed. For example, when scanning the sensing line groups 200-224 horizontally arranged, a sequential scanning method generally is used. That is, the sensing line group 200 is firstly scanned, next the sensing line groups 202, 204 . . . 210, 212, 214 . . . 220, 222, until 224 are scanned. A non-sequential scanning (e.g., interlacing scanning) method can be used instead, for example, the sensing line group 202 is firstly scanned, next the sensing line group 212 is scanned, and then the sensing line group 222 is scanned; once there is an object touching possibility on one of the sensing line groups possibly touched by an object (e.g., voltage changes in the sensing line group 212), other sensing line groups near this sensing line group will be further scanned (e.g., the sensing line groups 210, 214, etc.), so as to determine a sensing area where the object exists according to a sensed peak voltage. Similarly, when scanning the sensing line groups 230~254 vertically arranged, any one of the above-mentioned methods can be used.

Figure 3A:
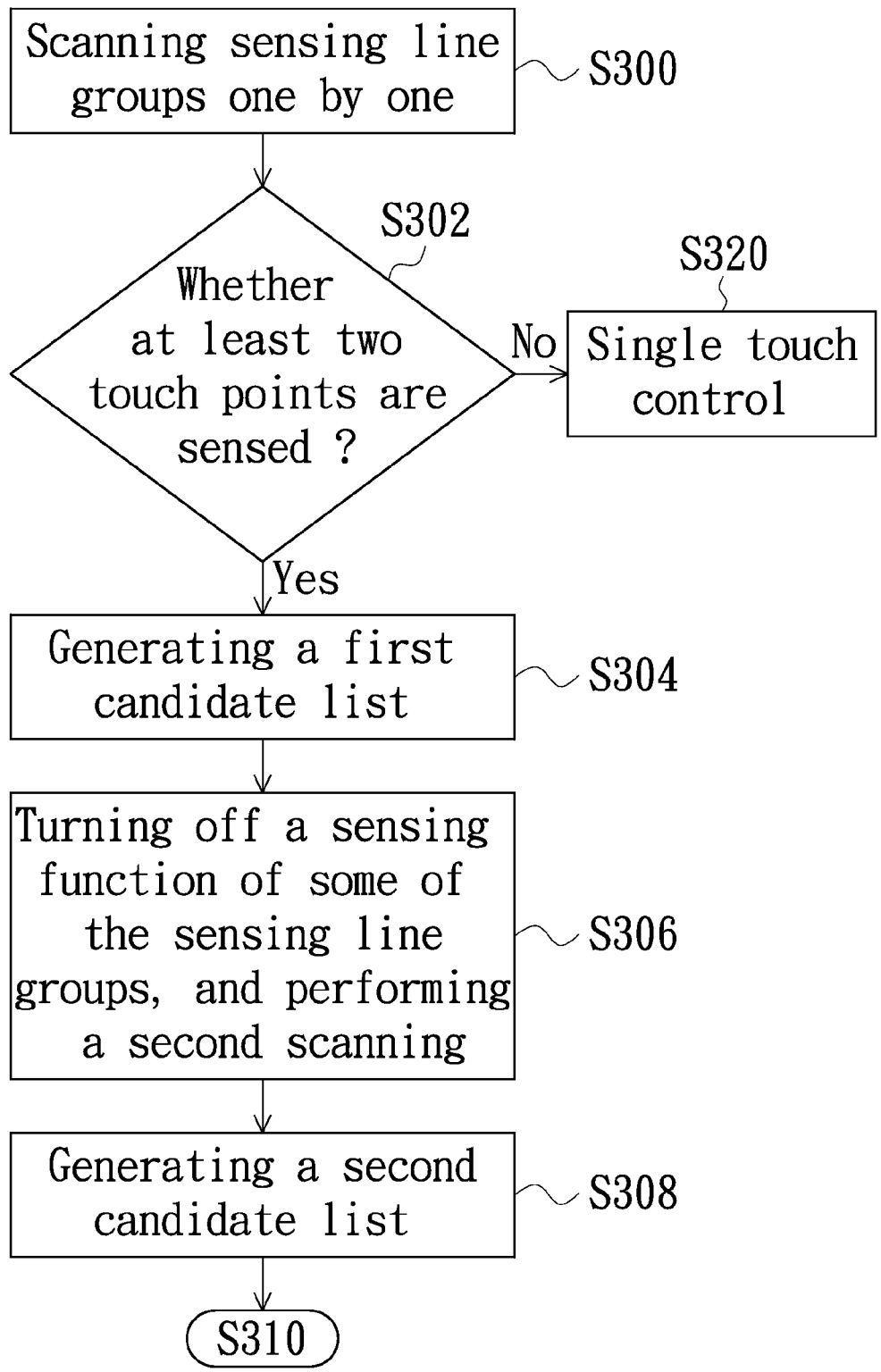
FIGS. 3A-3C show a flow chart of a resistive touch sensing method in accordance with an exemplary embodiment.
Figure 3B:
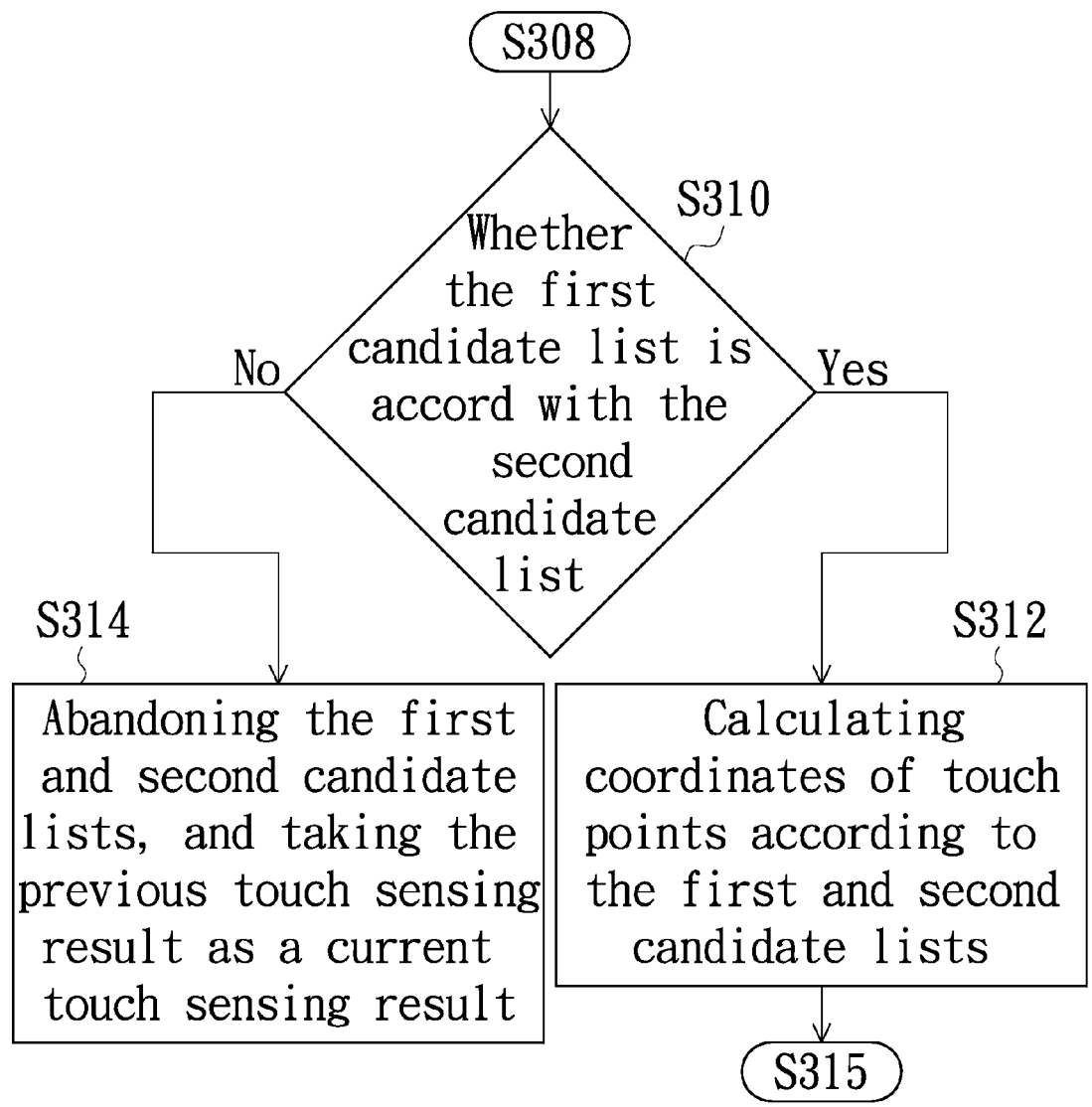
Figure 3C:
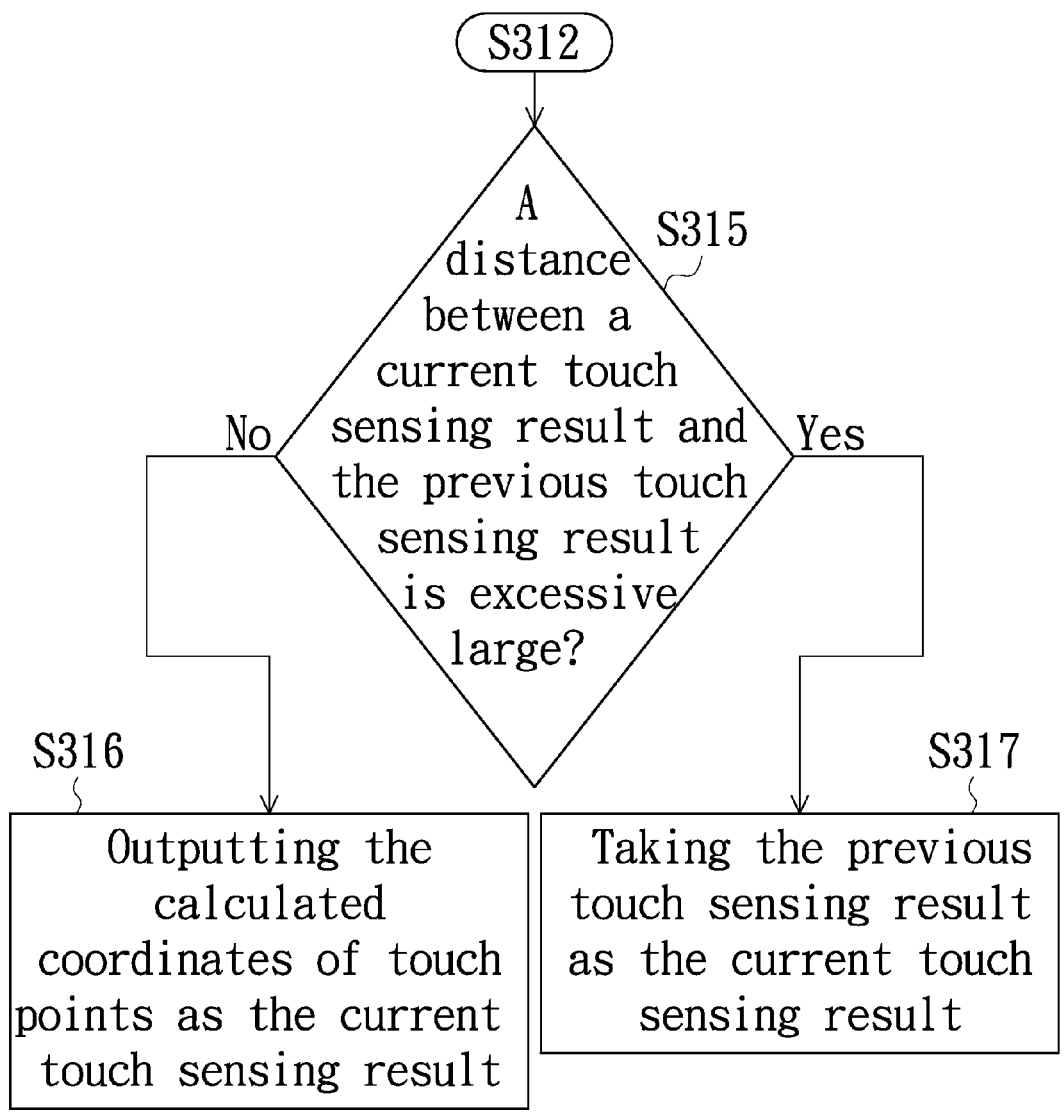

Referring to FIGS. 3A-3C, showing a flow chart of a resistive touch sensing method in accordance with an embodiment of the present invention. In this embodiment, the sensing line groups 200~224 or 230~254 are scanned one by one using any one of the above-mentioned methods (step S300). Judging whether at least two touch points exist (i.e., are sensed) after finishing scanning (step S302). If only one touch point exists, single touch control is performed according to a general operation method (step S320). If at least two touch points exist, the processing circuit 260 combines positions of the sensing line groups where touch points exist to generate the first candidate list with positional coordinates of the many/multiple touch points (step S304).

After the first candidate list is generated, the processing circuit 260 will close a sensing function of some of the sensing line groups in a sensing module of a certain direction, and then perform a second scanning in this situation (step S306). Specifically, if the sensing line groups 200~224 as shown in FIG. 2A sense that an object touch point exists in each of the sensing line groups 202 and 222. The processing circuit 260 can choose one of the sensing line groups and turn it off, or select many sensing line groups related to one of the object touch points and turn them off, or turn off/close most of the sensing line groups, and then perform the second scanning. In other words, in the above-mentioned situation, the processing circuit 260 can only turn off the sensing line group 202 where peak voltage exists, or turn off many sensing line groups whose voltages change and near the sensing line group 202, or turn off the right side sensing line groups 200-212, or even only keep the sensing function of the sensing line group 222 while turn off the sensing function of the remained sensing line groups. After the above-mentioned turning off operations for the sensing line groups, some of the touch points of the first candidate list will be excluded by the second scanning, and a touch point(s) obtained by the second scanning is/are listed in a second candidate list for the use of subsequent processing (step S308).

In order to achieve the goal of turning off a sensing function of a certain sensing line group(s), this embodiment uses the architecture as shown in FIG. 1 for the convenience of description. Referring to FIG. 1, when needs to turn off the sensing function of the sensing line group 112, the switch 112a may switch to a voltage level same as the voltage level connected with the switches 122a and 126a. For example, when performing a normal sensing operation the switches 112a and 116a may respectively be electrically coupled to the input voltage level lines 112v and 116v, and the switches 122a and 126a may respectively be electrically coupled to the ground lines 122g and 126g. When turning off the sensing function of the sensing line group 112, the switch 112a can be electrically coupled to the grounding line 112g, thereby achieving the goal of turning off the sensing function of the sensing line group 112.

Referring to FIG. 2A, FIG. 2B and FIGS. 3A-3C together, after generating the second candidate list in step S308, the processing circuit 260 compares contents of the first and second candidate lists to determine whether the first candidate list is accorded with the second candidate list (step S310). If the first candidate list is accorded with the second candidate list, coordinates of the touch points are calculated according to the first and second candidate lists (step S312). Whereas, if the first candidate list is not accorded with the second candidate list, there are several methods will be described as follows. One method is to directly abandon the first and second candidate lists and take the previous touch sensing result as a current touch sensing result (step S314). Another method is to perform a third scanning, calculate coordinates of the touch points according to the sensing result of the third scanning and coordinates of the touch points of the first and second candidate lists, determine which one group of images has a minimum sum of coordinate movement displacement according to the calculation result, and define the two images having the minimum sum of coordinate movement displacement as continuous images. That is, the determined two images are defined to be a reasonable movement result.

In still another embodiment, after calculating the coordinates of the touch points according to the first and second candidate lists in step S312, coordinates of the touch points (or termed as the current touch sensing result) are compared with the previous touch sensing result to determine a distance between corresponding touch points of the two touch sensing results whether is excessive large (e.g., greater than a preset distance) (step S315). If the distance is not greater than the preset distance, the calculated coordinates of the touch points in step S312 are outputted as the current touch sensing result (step 316). Whereas, if the distance is greater than the preset distance, the previous touch sensing result is taken as the current touch sensing result (step S317).

It is noted that, so-called candidate lists being accorded with each other does not mean that there necessarily are touch points with same coordinates respectively in the two candidate lists, and it needs to judge/determine whether there is a touch point listed in the second candidate list is in a preset distance range in the vicinity of the touch points in the first candidate list. For example, a sliding of object generally has its regularity, so that during the sliding movement of the object, as long as a time interval between two scannings is regulated, a movement distance between the two scannings of most of objects would be less than the above-mentioned preset distance. However, assuming that an object just is lifted and then dropped down, or has been moved to the part where the sensing line groups are closed between the first and second scannings, it is difficult to determine correct coordinates of touch points because of excessive distance change between the first candidate list and the second candidate list.

In another embodiment, when a distance between the previous and latter images is excessive large, defining that a coordinate weight of the touch point in the latter image is less than the coordinate weight of the touch point in the previous image. When the distance between the previous and latter images is smaller, defining that a coordinate weight of the touch point in the latter image is greater than the coordinate weight of the touch point in the previous image. Or, their weights can be changed along a trajectory curve of approximate 45 degree or along a movement trace on the diagonal direction of a screen, that is, higher weights are given to recorded historical coordinates in previous times while lower weights are given to current coordinates, thereby maintaining a smooth curve and inhibiting the occurrence of wavy trajectory.

Figure 4A:
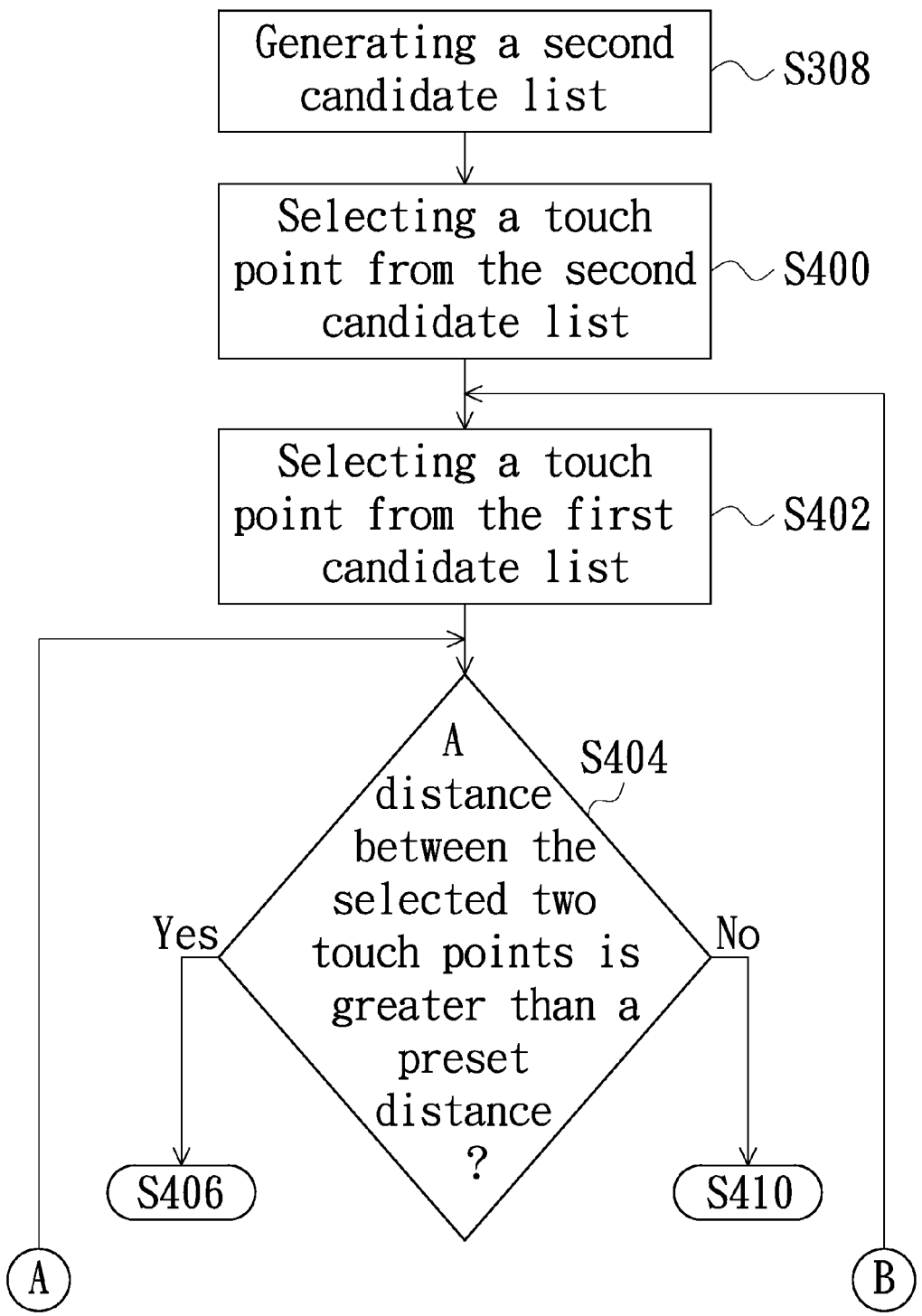
FIGS. 4A-4C show an implementation step flow chart in accordance with an exemplary embodiment when determining whether a first candidate list is accorded with a second candidate list.
Figure 4B:
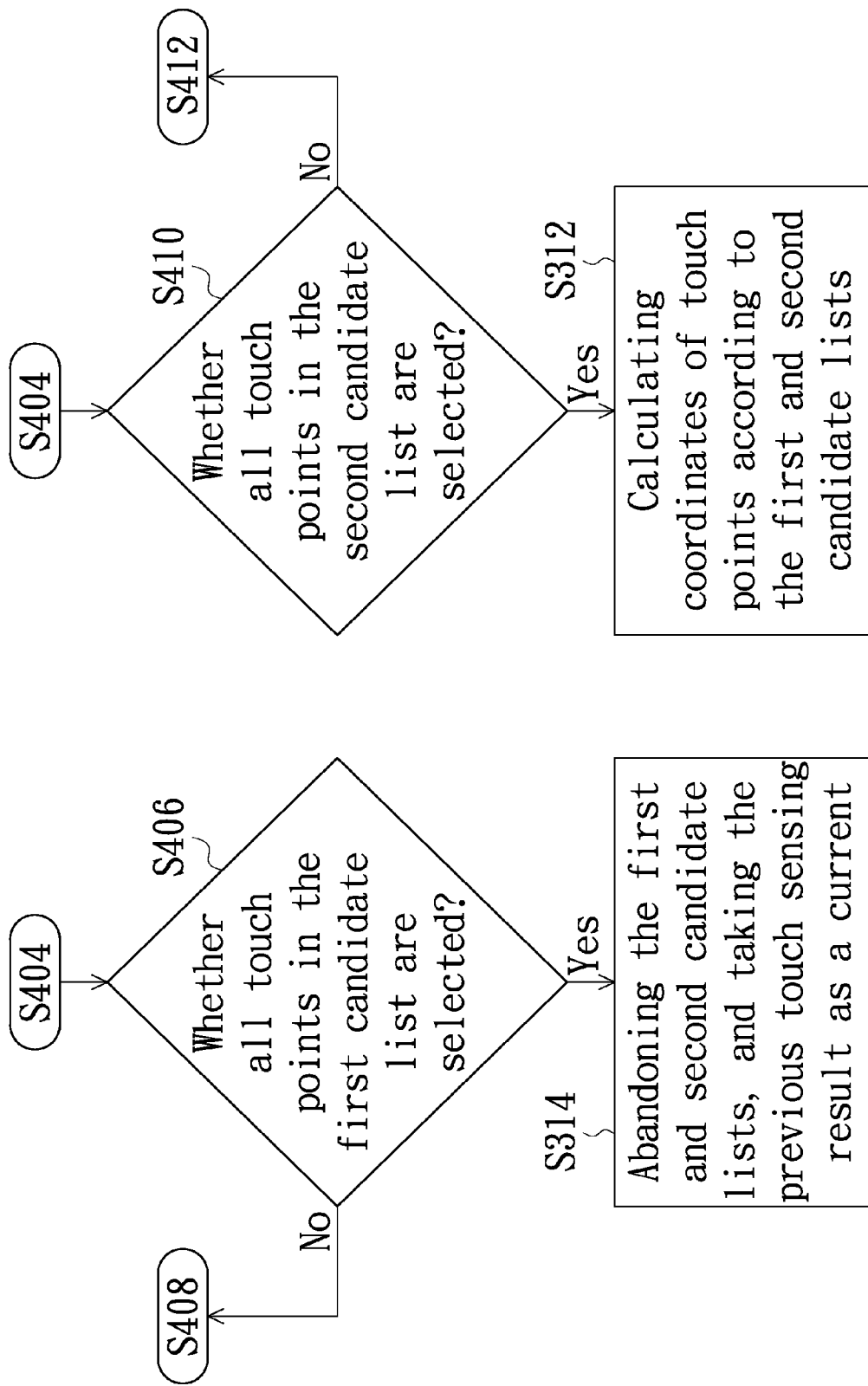
Figure 4C:
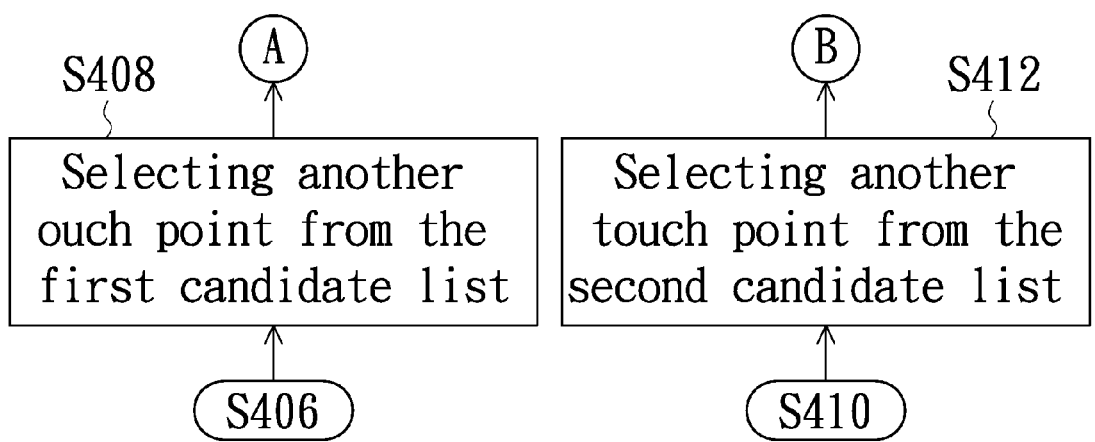

Referring to FIG. 2A, FIG. 2B, and FIGS. 4A-4C together, FIGS. 4A-4C show an implementation step flow chart in accordance with an exemplary embodiment when determining whether a first candidate list is accorded with a second candidate list. In this embodiment, after generating the second candidate list from step S308, a touch point is selected from each of the first candidate list and the second candidate list (steps S400 and S402). Next, the processing circuit 260 of FIG. 2A and FIG. 2B calculates the distance between the selected two touch points respectively from the first and second candidate lists, and determines the distance between the selected two touch points whether is greater than a preset distance (step S404).

If the determination result of the step S404 is "Yes", the procedure goes to step S406. In step S406, the processing circuit 260 determines whether all of the touch points in the first candidate list are selected to perform distance calculations with the selected touch point in the second candidate list. If the determination result of the step S406 is "No", another touch point is selected from the first candidate list (step S408) and another distance calculation is performed to the selected another touch point and the selected touch point from the second candidate list (step S404). On the contrary, if the determination result of the step S406 is "Yes", it indicates that there is one (or any) touch point of the second candidate list and all the touch points of the first candidate list are distant greater than the preset distance, the procedure goes to step S314 to abandon the first and second candidate lists and generate a current touch sensing result according to the previous touch sensing result. It is noted that, the step S406 going to the step S314 only is for the purpose of matching with the embodiment as illustrated in FIGS. 3A-3C. It is understood to the skilled person in the art that, the step S314 can be implemented with other behavior, such as another kind of touch result generating method alternative with the above-mentioned step S314 or other touch result generating methods.

If the determination result of the step S404 is "No", the procedure goes to step S410. In step S410, the processing circuit 260 determines whether all the touch point(s) in the second candidate list is/are selected to perform the distance calculation with the selected touch point in the first candidate list. If the determination result of the step S410 is "No", another touch point is selected from the second candidate list (step S412) and another distance calculation is performed to the selected another touch point and the selected touch point from the first candidate list (step S404). On the contrary, if the determination result of the step S410 is "Yes", it indicates that each of the touch points of the second candidate list and any one of the touch points of the first candidate point are distant without greater than the preset distance, the procedure then goes to step S312 to calculate the positions of the two objects according to the touch points of the first and second candidate lists.

It is noted that, in the steps S400-S412 as shown in FIGS. 4A-4C, if the first and second candidate lists are exchanged, the resistive touch controlling system can also normally operate/run.

Figure 5A:
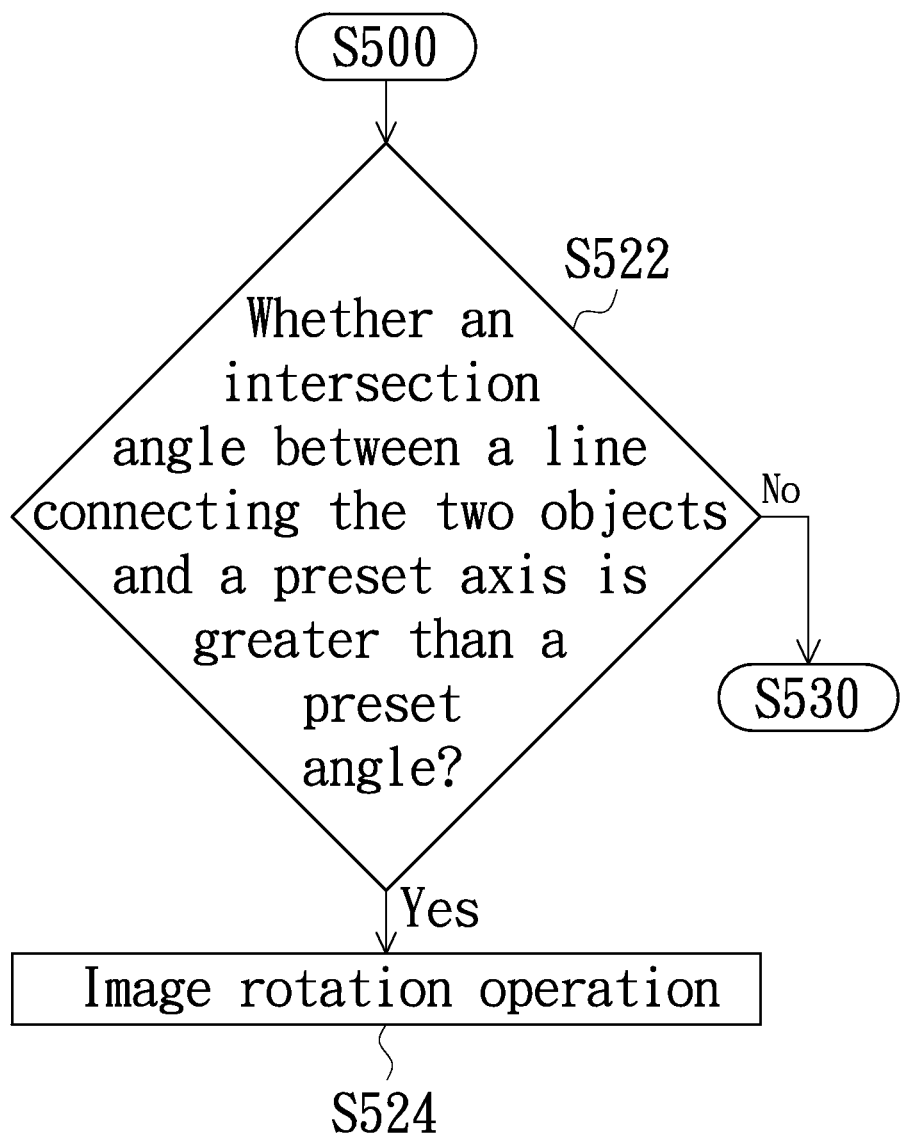
FIGS. 5A-5C show a flow chart of other positioning and operating methods in accordance with an exemplary embodiment.
Figure 5B:
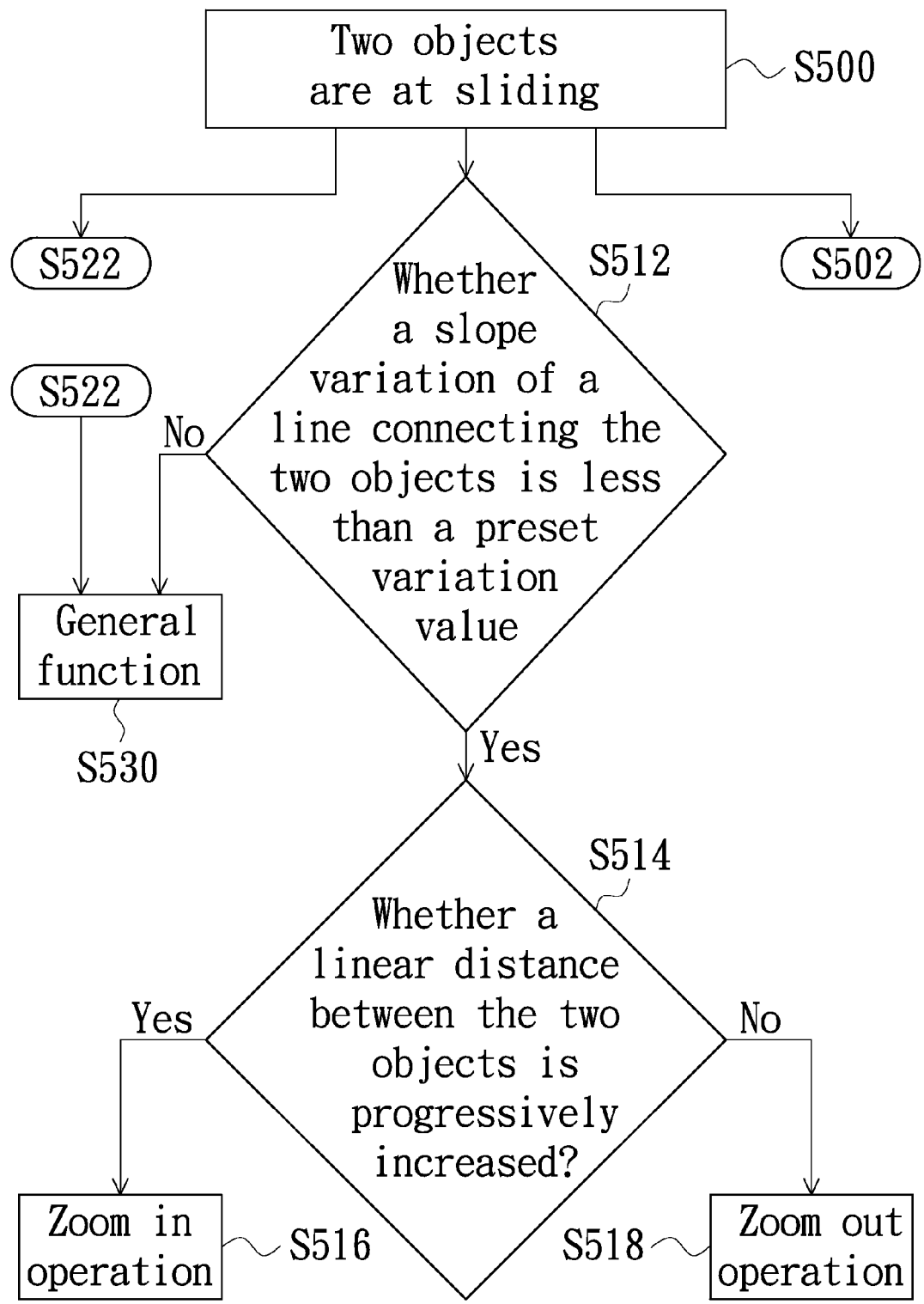
Figure 5C:
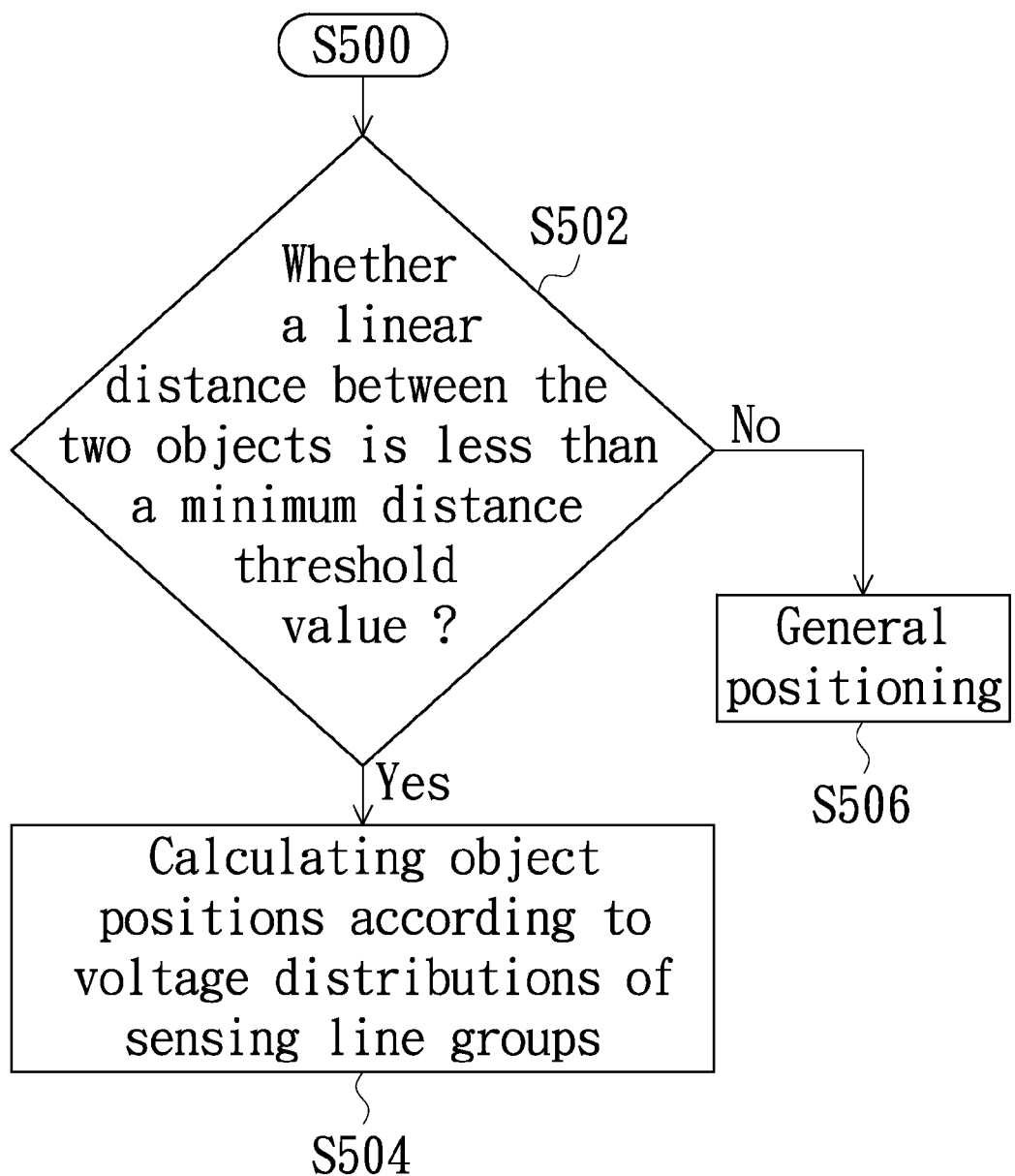

In addition to the above-mentioned sensing methods, the resistive touch controlling system in accordance with the present invention can further provide other positioning and operating methods. Referring to FIGS. 5A-5C, showing a flow chart of the other positioning and operating methods according to an embodiment of the present invention. As shown in FIGS. 5A-5C, after continuous many times of touch sensing, when the touch sensing results obtained using the foregoing or other methods shows that the two objects on the resistive touch controlling system are at sliding (step S500), the resistive touch controlling system (or above-mentioned processing circuit included in the resistive touch controlling system) will select various positioning or operating methods defined in steps S502, S512, S522 and subsequent steps.

When the two objects are at sliding, the resistive touch controlling system can further determine a linear distance between the two objects whether is less than a minimum distance threshold value (step S502). If the linear distance between the two objects is not less than the minimum distance threshold value, it indicates that a positional interval of the two objects is enough to distinguish the two touch points, and therefore can use a general positioning method to locate coordinates of the touch points (step S506). If the linear distance between the two objects is less than the minimum distance threshold value, it indicates that the two objects are too close and the two touch points might be not clearly distinguished, in this situation, positions of the objects can be calculated according to voltage distributions of the sensing line groups obtained from several continuous times of scanning (step S504).

Specifically, when the two objects are sliding to be close, and it can be found from the detected sensing line group voltages that positions of the two peak voltages will gradually be close to each other and finally combine into one peak voltage (i.e., the two objects are close to be distinguished). At this time, a proportion computation can be performed using the voltage distributions of the sensing line groups to calculate the latest object positions. The proportion computation is to use the information of the two peak voltages before being combined with each other to calculate the proportion of them according to relationships between the peak voltages and respective areas in a final data of the two peak voltages just before being combined with each other and then use the calculated out proportion to decompose the combined peak voltage. For example, before being combined, a proportion of a left-sided peak voltage area to a right-sided peak voltage area is 10:1. The 10/11 of the combined peak voltage area on the left is set as a new left peak voltage, and the 1/11 of the combined peak voltage area on the right is set as a new right peak voltage. Centers of the touch points can also be determined according to the above calculated proportion. For example, in the above-mentioned embodiment, a new left peak voltage position can be obtained by calculating a center or a center of gravity of the 10/11 of the combined peak voltage area on the left, a new right peak voltage position can be obtained by calculating a center or a center of gravity of the 1/11 of the combined peak voltage area on the right, and finally the new left peak voltage position and the new right peak voltage position are taken as coordinates of the two touch points Referring to FIGS. 5A-5C, when the two objects are at sliding, the resistive touch controlling system can further determine a slope variation of a line connecting the two objects whether is less than a preset variation value (step S512). If the slope variation is not less than the preset variation value, the resistive touch controlling system performs a general function (step S530). If the slope variation is less than the preset variation value, the resistive touch controlling system determines a linear distance between the two objects whether is progressively increased or decreased (step S514). If the determination result shows that the linear distance between the two objects is progressively increased, the processing circuit 130 enables the resistive touch controlling system to perform a zoom in operation (steps S516). On the contrary, if the determination result shows that the linear distance between two objects is progressively decreased, the processing circuit 130 enables the resistive touch controlling system to perform a zoom out operation (step S518).

FIGS. 5A-5C also show that when the two objects are at sliding, the resistive touch controlling system can further determine an intersection angle between a line connecting the two objects and a preset axis whether is greater than a preset angle (step S522). If the intersection angle is not greater than the preset angle, the processing circuit 130 enables the resistive touch controlling system to perform a general function (step S530). Whereas, if the intersection angle is greater than the preset angle, the processing circuit 130 enables the resistive touch controlling system to perform an image rotation operation (step S524).

It is noted that, the preset axis mentioned in the step S522 can be a horizontal axis H or a perpendicular axis V as shown in FIG. 2A and FIG. 2B, and can also be any preset axis direction. Moreover, in another embodiment, during scanning the sensing line groups to obtain sensing voltages, if a sensed peak voltage is less than a certain scale of a maximum peak voltage, the small voltage is treated as an interference signal and a change of the small voltage is ignored. In addition, when the number of touch points in a current image is less than the number of touch points in the previous image, the previous image data can be temporary retained, and when the numbers of touch points in many subsequent images all are less than the number of the touch points of the previous image, the previous image data is abandoned and the latest image data is outputted.

In summary, in the resistive touch controlling system and sensing method of the present invention, the consistency of the previous and latter scanning results are confirmed, so that the touch point coordinates can be accurately determined and the possibility of coordinate determination failure can be reduced.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

Figure 6:
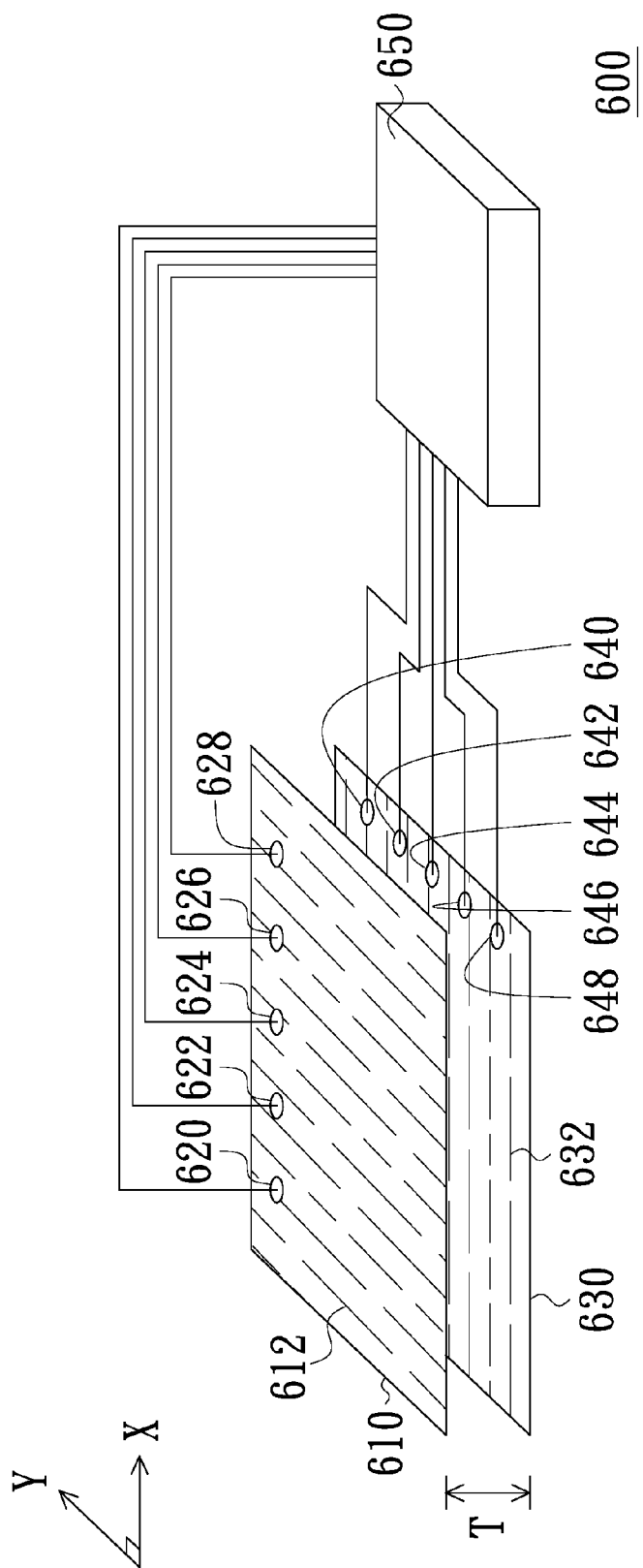
FIG. 6 is a schematic view of a touch input apparatus in accordance with an embodiment of the present invention.

FIG. 6 is a schematic view of a touch input apparatus in accordance with an exemplary embodiment of the present invention. As shown, the touch input apparatus 600 includes carbon nanotube (CNT) layers 610, 630, contact pads 620~628, 640~648 and a processing circuit 650. The carbon nanotubes (designated by 612) of the carbon nanotube layer 610 are disposed to be roughly parallel to a first direction; and the carbon nanotubes (designated by 632) of the carbon nanotube layer 630 are disposed to be roughly parallel to a second direction. In this embodiment, the first direction is Y-axis direction and the second direction is X-axis direction. In addition, the carbon nanotube layers 610, 630 have a predetermined distance T therebetween. The contact pads 620~628 are electrically connected to an edge of the carbon nanotube layer 610 and arranged in a line perpendicular to the first direction (or, along the X axis). The contact pads 640~648 are electrically connected to an edge of the carbon nanotube layer 630 and arranged in a line perpendicular to the second direction (or, along the Y axis).

Figure 7:
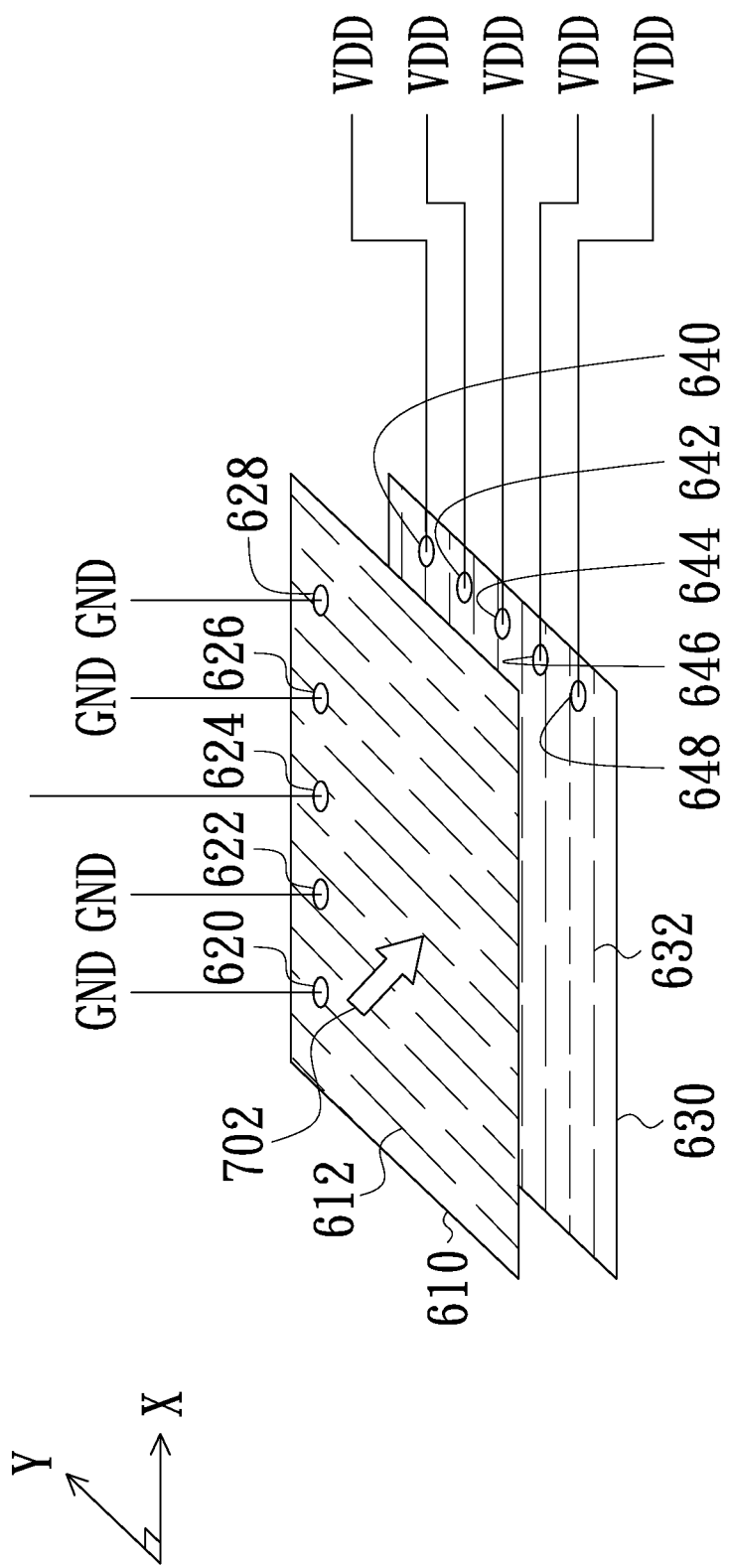
FIG. 7 is a schematic view for an illustration of a touch sensing process of the touch input apparatus in FIG. 1.

The processing circuit 650 is electrically connected to the contact pads 620~628, 640~648, and its operation way will be described via an illustration of FIG. 7, which is a schematic view for an illustration of a touch sensing process of the touch input apparatus in FIG. 6. As shown in FIG. 7, the processing circuit 650, in a first period, is configured to provide a first comparison voltage (for example, a power supply voltage VDD) to the contact pads 640~648, sequentially operate the contact pads 620~628 in a floating state according to a first predetermined order (for example, in a manner from left to right) and simultaneously electrically connect the contact pads 620~628 not being operated in the floating state to a first reference voltage (for example, a ground voltage GND) so as to sequentially read out the voltage values of the contact pads 620~628 operated in the floating state. Therefore, the processing circuit 650 can calculate an external force (designated by arrow 702) a position thereof at the X axis on the carbon nanotube layer 610 according to the five voltage values, which are read out from the contact pads 620~628 sequentially operated in the floating state, while the carbon nanotube layer 610 is being applied with the external force and thereby resulting in a corresponding forced point (or, a touch point) on the carbon nanotube layer 610 to electrically contact to the carbon nanotube layer 630. The calculation of the forced point's position on the on the carbon nanotube layer 610 is described in detail in the following.

Because the carbonnanotubes 612 of the carbon nanotube layer 610 are roughly parallel to the Y axis and due to the anisotropic resistance characteristics therein, the carbon nanotube layer 610 has a resistance value in the X-axis direction much larger than that in the Y-axis direction. Thus, among the five readout voltage values respectively from the contact pads 620~628, the contact pad 624, due to it is corresponding to the external force 702, has a largest voltage value. Therefore, through the position of the contact pad 624 at the X axis on the carbon nanotube layer 610, the processing circuit 650 can determine the position of the external force 702 at the X axis on the carbon nanotube layer 610. In other words, among the five readout voltage values the processing circuit 650 firstly determines the largest one and its corresponding contact pad from the five contact pads 620~628; and then calculates the forced point's position at the X axis (or, in the second direction) on the carbon nanotube layer 610 according to the position of the contact pad corresponding to the largest voltage value at the X axis on the carbon nanotube layer 610. Because the anisotropic resistance characteristics in each carbon nanotube 612, the five contact pads 620~628 each can have its individual voltage value without interference therebetween even the carbon nanotube layer 610 is simultaneously applied with more than one external force and accordingly more than one touch point are simultaneously sensed. Thus, the touch input apparatus according to the present invention is adapted to use to sense multiple touch points.

Similarly, the processing circuit 650, in a second period, is configured to provide a second comparison voltage (for example, a power supply voltage VDD) to the contact pads 620~628, sequentially operate the contact pads 640~648 in a floating state according to a second predetermined order (for example, in a manner from top to bottom) and simultaneously electrically connect the contact pads 640~648 not being operated in the floating state to a second reference voltage (for example, a ground voltage GND) so as to sequentially read out the voltage values of the contact pads 640~648 operated in the floating state. Therefore, the processing circuit 650 can calculate an external force (designated by arrow 702) a position thereof at the Y axis on the carbon nanotube layer 610 according to the five voltage values, which are read out from the contact pads 640~648 sequentially operated in the floating state, while the carbon nanotube layer 610 is being applied with the external force and thereby resulting in a corresponding forced point (or, a touch point) on the carbon nanotube layer 610 to electrically contact to the carbon nanotube layer 630.

Besides, in a preferred embodiment, the carbon nanotube layers 610, 630 can be configured to always have an opposite polarity from each other. For example, in the second period, the contact pads 620~628 are configured to be electrically connected to the second comparison voltage (for example, the ground voltage GND); the contact pads 640~648 are sequentially configured to be operated in a floating state in a second predetermined order and the contact pads 640~648 not being operated in a floating state are configured to be electrically connected to the second reference voltage (for example, the power supply voltage VDD); and among the contact pads 640~648 the processing circuits 650 can determine the one having a smallest voltage value so as to calculate the forced points' positions at the Y axis on the carbon nanotube layer 610. Accordingly, the carbon nanotube layers 610, 630 each can have a fixed polarity without the need of reversing the polarities thereof for each voltage-readout scan, and thus the touch input apparatus can have a higher power saving efficiency. In other words, in an embodiment the first and the second comparison voltages both can be implemented with the power supply voltage VDD; and the first and the second reference voltages both can be implemented with the ground voltage GND. In another embodiment, the first comparison voltage and the second reference voltage both can be implemented with the power supply voltage VDD; and the second comparison voltage and the first reference voltages both can be implemented with the ground voltage GND.

Because the carbon nanotubes 632 of the carbon nanotube layer 630 are roughly parallel to the X axis and due to the anisotropic resistance characteristics therein, the carbon nanotube layer 630 has a resistance value in the Y-axis direction much larger than that in the X-axis direction. Thus, among the five readout voltage values respectively from the contact pads 640~648, the contact pad 644, due to it is corresponding to the external force 702, has a largest or smallest voltage value. Therefore, through the position of the contact pad 644 at the Y axis on the carbon nanotube layer 610, the processing circuit 650 can determine the position of the external force 702 at the Y axis on the carbon nanotube layer 610. In other words, among the five readout voltage values the processing circuit 650 firstly determines the largest or smallest one and its corresponding contact pad from the five contact pads 640~648; and then calculates the forced point's position at the Y axis (or, in the first direction) on the carbon nanotube layer 610 according to the position of the contact pad corresponding to the largest or smallest voltage value at the Y axis on the carbon nanotube layer 610.

In addition, the processing circuit 650 is further configured to calculate the aforementioned external force's strength based on the readout voltage values. Several calculation means for the determination of the aforementioned external force's strength are exemplarily illustrated in the following.

In a first calculation mean, among the five readout voltage values respectively from the five contact pads 620~628 the processing circuit 650 is configured to obtain a voltage value of the contact pad corresponding to the forced point; obtain a voltage value(s) of at least one contact pad arranged on the left of the contact pad corresponding to the forced point; obtain a voltage value(s) of at least one contact pad arranged on the right of the contact pad corresponding to the forced point; and obtain a voltage representative value through performing a summing or an weighted averaging operation on the aforementioned obtained voltage values so as to calculate the external force's strength based on the voltage representative value. For example, as illustrated in FIG. 7, the processing circuit 650 performs a summing or an weighted averaging operation on the three voltage values respectively of the contact pads 622~626 to obtain the voltage representative value; wherein the contact pad 624 is the one corresponding to the external force 702.

Similarly, in a second calculation mean, among the five readout voltage values respectively from the five contact pads 640~648 the processing circuit 650 is configured to obtain a voltage value of the contact pad corresponding to the forced point; obtain a voltage value(s) of at least one contact pad arranged on the left of the contact pad corresponding to the forced point; obtain a voltage value(s) of at least one contact pad arranged on the right of the contact pad corresponding to the forced point; and obtain a voltage representative value through performing a summing or an weighted averaging operation on the aforementioned obtained voltage values so as to calculate the external force's strength based on the voltage representative value. For example, as illustrated in FIG. 7, the processing circuit 650 performs a summing or an weighted averaging operation on the three voltage values respectively of the contact pads 642~646 to obtain the voltage representative value; wherein the contact pad 644 is the one corresponding to the external force 702.

In a third calculation mean, among the five readout voltage values respectively from the five contact pads 620~628 the processing circuit 650 is configured to obtain a voltage value of the contact pad corresponding to the forced point; obtain a voltage value(s) of at least one contact pad arranged on the left or right of the contact pad corresponding to the forced point; and obtain a slope or a shape of a voltage distribution of the aforementioned obtained voltage values so as to calculate the external force's strength based on the slope or the shape. For example, as illustrated in FIG. 7, the processing circuit 650 obtains a slope or a shape of a voltage distribution based on the two voltage values of the contact pads 624, 622 or the contact pads 624, 626; wherein the contact pad 624 is the one corresponding to the external force 702.

Similarly, in a fourth calculation mean, among the five readout voltage values respectively from the five contact pads 640~648 the processing circuit 650 is configured to obtain a voltage value of the contact pad corresponding to the forced point; obtain a voltage value(s) of at least one contact pad arranged on the left or right of the contact pad corresponding to the forced point; and obtain a slope or a shape of a voltage distribution of the aforementioned obtained voltage values so as to calculate the external force's strength based on the slope or the shape. For example, as illustrated in FIG. 7, the processing circuit 650 obtains a slope or a shape of a voltage distribution based on the two voltage values of the contact pads 644, 642 or the contact pads 644, 646; wherein the contact pad 644 is the one corresponding to the external force 702.

In a fifth calculation mean, among the five readout voltage values respectively from the five contact pads 620~628 the processing circuit 650 is configured to obtain a voltage value of the contact pad corresponding to the forced point; and covert the obtained voltage value into a strength based on a voltage-to-strength curve so as to refer to the obtained strength as the external force's strength. For example, as illustrated in FIG. 7, the processing circuit 650 calculates the strength of the external force 702 based on the voltage value of the contact pad 624, wherein the contact pad 624 is the one corresponding to the external force 702.

Similarly, in a sixth calculation mean, among the five readout voltage values respectively from the five contact pads 640~648 the processing circuit 650 is configured to obtain a voltage value of the contact pad corresponding to the forced point; and covert the obtained voltage value into a strength based on a voltage-to-strength curve so as to refer to the obtained strength as the external force's strength. For example, as illustrated in FIG. 7, the processing circuit 650 calculates the strength of the external force 702 based on the voltage value of the contact pad 644, wherein the contact pad 644 is the one corresponding to the external force 702.

Based on the aforementioned calculation manners, it is understood that the processing circuit 650 can also calculate a plurality of external forces' strength according to corresponding readout voltage values while the carbon nanotube layer 610 is being applied with these external forces thereby resulting in the corresponding forced points to electrically contact to the carbon nanotube layer 630.

Figure 8:
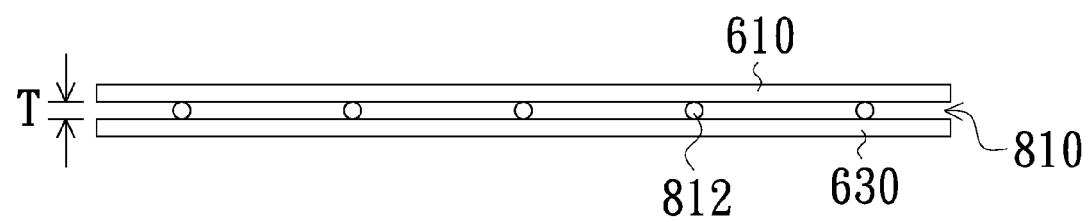
FIG. 8 is a schematic view illustrating a space layer disposed between two carbon nanotube layers.

It is to be noted that, the touch input apparatus in FIG. 6 may further include a space layer. As shown in FIG. 8, a space layer 810 is disposed between the carbon nanotube layers 610, 630. In addition, the space layer 810 can have a thickness of the aforementioned predetermined distance T and is constituted by a plurality of spacers 812. In addition, it is to be noted that the carbon nanotube layers 610, 630 each are exemplified by, but without a limitation, being electrically connected to five contact pads. However, the carbon nanotube layers 610, 630 each can be configured to be electrically connected to different number of contact pads based on the actual needs of the resolution for the touch identification. Moreover, it is to be noted that the positions of the carbon nanotube layers 610, 630 can swap in this embodiment.

Figure 9B:
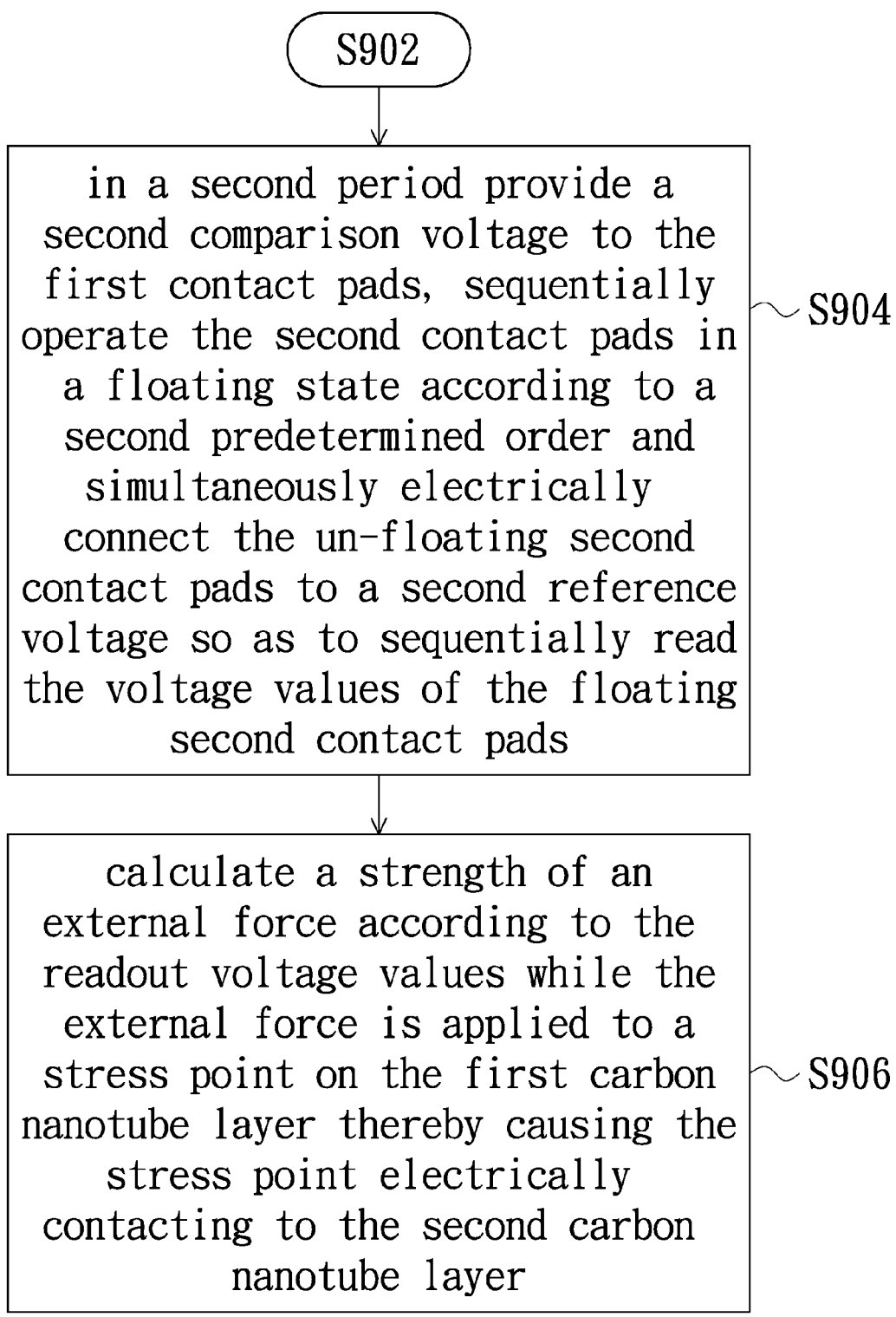

Therefore, the ordinarily skilled in the art can obtain an operation method of a touch input apparatus through summarizing some basic operation steps in the aforementioned touch input apparatus. FIGS. 9A, 9B are flow charts of an operation method of a touch input apparatus in accordance with an embodiment of the invention. The touch input apparatus includes a first carbon nanotube layer, a second carbon nanotube layer, a plurality of first contact pads and a plurality of second contact pads. The carbon nanotubes of the first carbon nanotube layer are roughly disposed to be parallel to a first direction. The carbon nanotubes of the second carbon nanotube layer are roughly disposed to be parallel to a second direction. The first and the second carbon nanotube layers have a predetermined distance therebetween. The first contact pads are electrically connected an edge of the first carbon nanotube layer and arranged in a line perpendicular to the first direction. The second contact pads are electrically connected to an edge of the second carbon nanotube layer and arranged in a line perpendicular to the second direction. As shown in FIGS. 9A, 9B, the operation method includes steps of: in a first period providing a first comparison voltage to the second contact pads, sequentially operating the first contact pads in a floating state according to a first predetermined order and simultaneously electrically connecting the first contact pads not being operated in the floating state to a first reference voltage so as to sequentially read out voltage values of the first contact pads operated in the floating state (step S902); in a second period providing a second comparison voltage to the first contact pads, sequentially operating the second contact pads in a floating state according to a second predetermined order and simultaneously electrically connecting the second contact pads not being operated in the floating state to a second reference voltage so as to sequentially read out voltage values of the second contact pads operated in the floating state (step S904); and calculating an external force's strength according to the readout voltage values while the first carbon nanotube layer is applied with the external force and thereby resulting in a corresponding forced point on the first carbon nanotube layer to electrically contact to the second carbon nanotube layer (step S906).

It is to be noted that the aforementioned operation method can further include a step of: calculating the forced point's position on the first carbon nanotube layer according to the readout voltage values. In addition, if the first carbon nanotube layer is applied with a plurality of external forces and thereby resulting in corresponding forced points on the first carbon nanotube layer to electrically contact to the second carbon nanotube layer, the step S906 can be revised to: calculating the external forces' strength according to the readout voltage values.

Compared with the embodiment shown by FIG. 6, the touch input apparatus according to another embodiment has a same hardware architecture but the processing circuit thereof adopts a different operation way. Therefore, the touch input apparatus according to the second embodiment will be described in the following with a reference to the FIG. 6.

Please refer to FIG. 6 again. In the said another embodiment the processing circuit 650, in a first period, is configured to provide a first comparison voltage (for example, a power supply voltage VDD) to the contact pads 640~648 and read out the voltage values of the contact pads 620~628. In addition, the processing circuit 650, in a second period, is configured to provide a second comparison voltage (for example, a power supply voltage VDD) to the contact pads 620~628 and read out the voltage values of the contact pads 640~648. Specifically, the processing circuit 650 calculates an external force (designated by arrow 702) a strength thereof according to the readout voltage values while the carbon nanotube layer 610 is being applied with the external force and thereby resulting in a corresponding forced point (or, a touch point) on the carbon nanotube layer 610 to electrically contact to the carbon nanotube layer 630. In other words, the processing circuit 650 according to the said another embodiment directly reads out the voltage values of contact pads without sequentially operating the contact pads in a floating state and simultaneously electrically connecting the contact pads not being operated in the floating state to a reference voltage (for example, a ground voltage GND).

In addition, the calculation means, adopted in the processing circuit 650 according to this embodiment and for the computation of the external force's strength and the forced point's position on the carbon nanotube layer 610, are same as that in the embodiment shown by FIG. 6, so herein no any unnecessary detail will be given. Moreover, based on the same calculation manner the processing circuit 650 can further calculate a plurality of external forces' strength based on the readout voltage values while the carbon nanotube layer 610 is being applied with the external forces and thereby resulting in corresponding forced points on the carbon nanotube layer 610 to electrically contact to the carbon nanotube layer 630.

Figure 10:
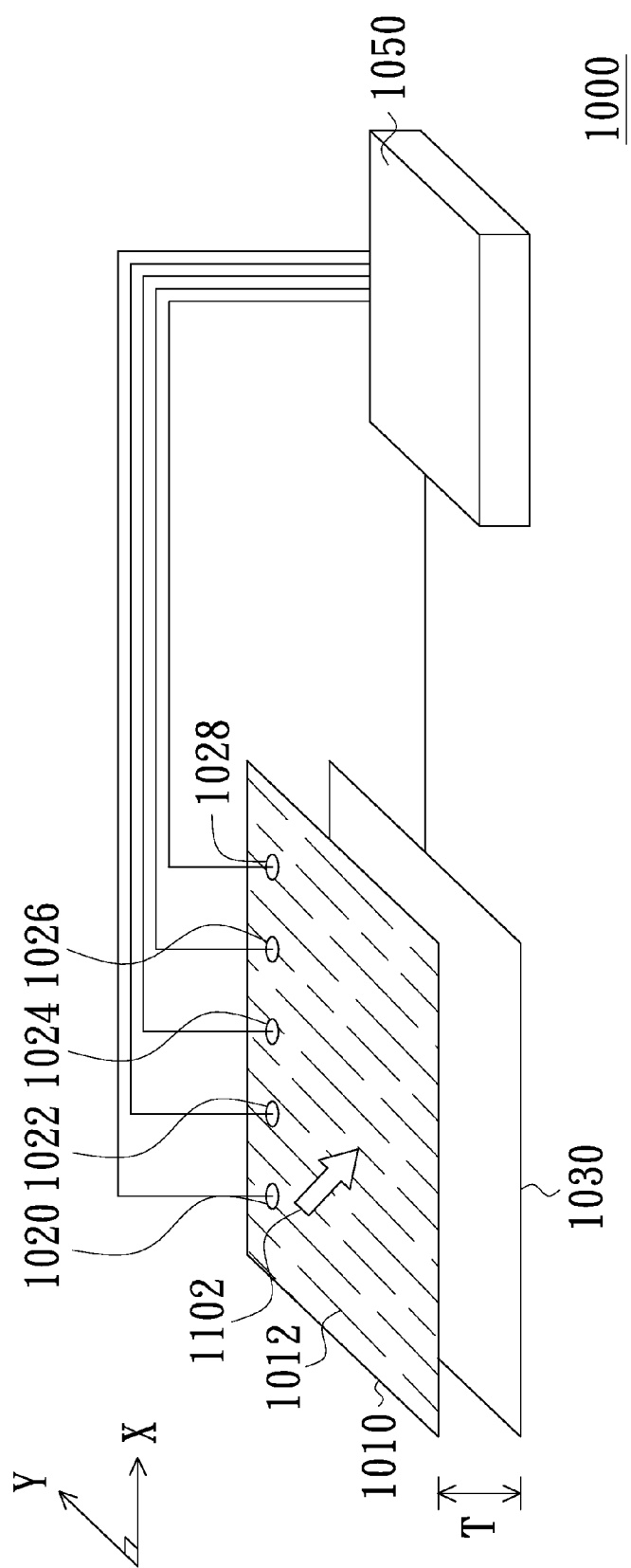
FIG. 10 is a schematic view of a touch input apparatus in accordance with an embodiment of the present invention.

Compared with the two embodiments discussed above, the touch input apparatus according to still another embodiment uses a conductive layer to replace one of the carbon nanotube layers, as shown in FIG. 10, which is a schematic view of a touch input apparatus in accordance with the said still another embodiment of the present invention.

As shown, the touch input apparatus 1000 includes a carbon nanotube layer 1010, contact pads 1020~1028, a conductive layer 1030 and a processing circuit 1050. The carbon nanotube layer 1010 of which each carbon nanotube (designated by 1012) is disposed to be roughly parallel to a first direction. In this embodiment, the first direction is a Y-axis direction; and the carbon nanotube layer 1010 and the conductive layer 1030 have a predetermined distance T therebetween. The conductive layer 1030 is implemented with, for example, an Indium Tin Oxide (ITO). The contact pads 1020~1028 are electrically connected to an edge of the carbon nanotube layer 1010 and arranged in a line perpendicular to the first direction; in other words, the contact pads 1020~1028 are arranged in a line along the X axis (or, a second direction).

The processing circuit 1050, electrically connected to the contact pads 1020~1028 and the conductive layer 1030, is configured to provide a comparison voltage (for example, a power supply voltage VDD) to the conductive layer 1030 and read out the voltage values of the contact pads 1020~1028. Specifically, the processing circuit 1050 calculates an external force (designated by arrow 1102) a strength thereof according to the readout voltage values while the carbon nanotube layer 1010 is being applied with the external force and thereby resulting in a corresponding forced point (or, a touch point) on the carbon nanotube layer 1010 to electrically contact to the conductive layer 1030. It is understood that, the processing circuit 1050 can further calculate the forced point's position on the carbon nanotube layer 1010 according to the readout voltage values.

In addition, the calculation means, adopted in the processing circuit 1050 according to this embodiment and for the computation of the external force's strength and the forced point's position on the carbon nanotube layer 1010, are same as that in the embodiment shown by FIG. 6, so herein no any unnecessary detail will be given. Moreover, based on the same calculation manner the processing circuit 1050 can further calculate a plurality of external forces' strength based on the readout voltage values while the carbon nanotube layer 1010 is being applied with the external forces and thereby resulting in corresponding forced points on the carbon nanotube layer 1010 to electrically contact to the conductive layer 1030.

In this embodiment the conductive layer 1030 is exemplified by being disposed under the carbon nanotube layer 1010; however, it is understood that the conductive layer 1030 can be disposed above the carbon nanotube layer 1010, alternatively. In addition, it is understood that the present invention can be implemented with having the nanotube layer 1010 of which each carbon nanotube 1012 disposed to be roughly parallel to the second direction (or, along the X axis).

In summary, to solve the problems in prior art, the touch input apparatus according to the present invention can be either constituted by two carbon nanotube layers thereby being adapted to sense touch points' two-dimensional position, or constituted by one carbon nanotube layer and one inductive layer thereby being adapted to sense touch points' one-dimensional position. Specifically, in the architecture of having two carbon nanotube layers, because the carbon nanotubes of the two carbon nanotube layers are respectively arranged to two different directions, an edge of one carbon nanotube layer is supplied with a comparison voltage (for example, a power supply voltage) and a plurality of voltage values are read out from an edge of the other carbon nanotube layer, the touch input apparatus can firstly determine the touch point's position and then calculate, convert or estimate an external force's strength based on the anisotropic resistance characteristics and the readout voltage values while one carbon nanotube layer is applied with the external force thereby resulting in a corresponding forced point on the one carbon nanotube layer to electrically contact to the other carbon nanotube layer. In addition, the sensing signals corresponding to a plurality of touch points, due to the anisotropic resistance characteristics, can have a much smaller interference therebetween, so the touch input apparatus according to the present invention is adapted for the multi-touch control and is capable of sensing the touch points' two-dimensional position.

In the architecture of having one carbon nanotube layer and one inductive layer, because only the inductive layer is supplied with a comparison voltage and a plurality of voltage values are read out from an edge of the carbon nanotube layer, the touch input apparatus can firstly determine the touch point's position according to the anisotropic resistance characteristics and the readout voltage values and then calculate, convert or estimate an external force's strength according to the readout voltage values while the carbon nanotube layer (or, the conductive layer) is applied with the external force thereby resulting in a corresponding forced point to electrically contact to the conductive layer (or, the carbon nanotube layer). In addition, the sensing signals corresponding to a plurality of touch points, due to the anisotropic resistance characteristics, can have a much smaller interference therebetween, so the touch input apparatus according to the present invention is adapted for the multi-touch control and is capable of sensing the touch points' one-dimensional position.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A touch input apparatus, comprising:
    a first carbon nanotube layer of which carbon nanotubes each are disposed to be roughly parallel to a first direction;
    a second carbon nanotube layer of which carbon nanotubes each are disposed to be roughly parallel to a second direction;
    a plurality of first contact pads electrically connected to an edge of the first carbon nanotube layer and a plurality of second contact pads electrically connected to an edge of the second carbon nanotube layer;
    a processing unit sequentially receives first output signals from the plurality of first contact pads in a first period and sequentially receive second output signals from the plurality of second contact pads in a second period, the first output signals are voltage values of each one of the first contact pads and the second output signals are voltage values of each one of the second contact pads;
    wherein, the processing determines a position of an external force according to the first output signals and the second output signals from the plurality of first contact pads and the plurality of second contact pads; and
    wherein, the processing determines a strength of the external force according to slopes or shapes of signal distributions of the first output signals from the plurality of first contact pads and the second output signals from the plurality of second contact pads.

2. The touch input apparatus according to claim 1, wherein the first and the second carbon nanotube layers having a predetermined distance there between.

3. The touch input apparatus according to claim 1, wherein the plurality of first contact pads are arranged in a line perpendicular to the first direction and the plurality of second contact pads are arranged in a line perpendicular to the second direction.

4. The touch input apparatus according to claim 1, wherein the processing unit configured to, in a first period, provide a first comparison voltage to the second contact pads, sequentially operate the first contact pads in a floating state according to a first predetermined order and simultaneously electrically connect the first contact pads not being operated in the floating state to a first reference voltage so as to sequentially read out the first output signals of the first contact pads operated in the floating state; the processing circuit further being configured to, in a second period, provide a second comparison voltage to the first contact pads, sequentially operate the second contact pads in the floating state according to a second predetermined order and simultaneously electrically connect the second contact pads not being operated in the floating state to a second reference voltage so as to sequentially read out the second output signals of the second contact pads operated in the floating state.

5. The touch input apparatus according to claim 1, wherein the processing unit configured to obtain the first output signal of the position of the first contact pad, obtain the first output signals of the at least one first contact pad arranged on the left or right of the first contact pad corresponding to the position, and determine the strength of the external force according to the slopes or the shapes of signal distributions of the first output signals.

6. The touch input apparatus according to claim 1, wherein the processing unit configured to obtain the second output signal of the position of the second contact pad, obtain the second output signals of the at least one second contact pad arranged on the left or right of the second contact pad corresponding to the position, and determine the strength of the external force according to the slopes or the shapes of signal distributions of the second output signals.

7. The touch input apparatus according to claim 4, wherein the first and the second comparison voltages both are a power supply voltage.

8. The touch input apparatus according to claim 4, wherein the first and the second reference voltages both are a ground voltage.

9. The touch input apparatus according to claim 4, wherein the first comparison voltage and the second reference voltage both are a power supply voltage; and the second comparison voltage and the first reference voltages both are a ground voltage.

10. The touch input apparatus according to claim 1, wherein the processing circuit is further configured to calculate the position on the first carbon nanotube layer according to the first output signals and the second output signals.

11. The touch input apparatus according to claim 1, wherein the processing circuit is further configured to obtain a largest voltage value of the first contact pads among the first output signals and calculate a coordinate relative to the second direction according to the position of the first contact pad corresponding to the largest voltage value of the first output signal on the first carbon nanotube layer; and the processing circuit is further configured to obtain a largest voltage value of the second contact pads among the second output signals and calculate a coordinate relative to the first direction according to the position of the second contact pad corresponding to the largest voltage value of the second output signal on the first carbon nanotube layer.

12. The touch input apparatus according to claim 1, further comprising:
a space layer disposed between the first and the second carbon nanotube layers and having a thickness of the predetermined distance.

13. An operation method of a touch input apparatus, the touch input apparatus comprising a first carbon nanotube layer, a second carbon nanotube layer, a plurality of first contact pads and a plurality of second contact pads, the first carbon nanotube layer of which carbon nanotubes each being disposed to be roughly parallel to a first direction, the second carbon nanotube layer of which carbon nanotubes each being disposed to be roughly parallel to a second direction, the first contact pads being electrically connected the first carbon nanotube layer an edge thereof, the second contact pads being electrically connected to the second carbon nanotube layer an edge thereof, the operation method comprising steps of:
sequentially receiving first output signals from the plurality of first contact pads in a first period and sequentially receive second output signals from the plurality of second contact pads in a second period;
determining a position of an external force according to the first output signals and the second output signals from the plurality of first contact pads and the plurality of second contact pads; and
determining a strength of the external force according to slopes or shapes of signal distributions of the first output signals from the plurality of first contact pads and the second output signals from the plurality of second contact pads;
wherein the first output signals are voltage values of each one of the first contact pads and the second output signals are voltage values of each one of the second contact pads.

14. The operation method according to claim 13, wherein the first and the second carbon nanotube layers having a predetermined distance there between.

15. The operation method according to claim 13, further comprising a step of:
in a first period providing a first comparison voltage to the second contact pads, sequentially operating the first contact pads in a floating state according to a first predetermined order and simultaneously electrically connecting the first contact pads not being operated in the floating state to a first reference voltage so as to sequentially read out the first output signals of the first contact pads operated in the floating state;
in a second period providing a second comparison voltage to the first contact pads, sequentially operating the second contact pads in the floating state according to a second predetermined order and simultaneously electrically connecting the second contact pads not being operated in the floating state to a second reference voltage so as to sequentially read out the second output signals of the second contact pads operated in the floating state.

16. The operation method according to claim 13, further comprising a step of:
among the readout voltage values of the first output signals obtaining a voltage value of a first contact pad corresponding to the position, obtaining a voltage value(s) of at least one first contact pad arranged on the left or right of the first contact pad corresponding to the position, and obtaining the slope or the shape of a voltage distribution of the obtained voltage values so as to estimate the external force's strength according to the slope or the shape.

17. The operation method according to claim 13, further comprising a step of:
among the readout voltage values of the second output signals obtaining a voltage value of a second contact pad corresponding to the position, obtaining a voltage value(s) of at least one second contact pad arranged on the left or right of the second contact pad corresponding to the position, and obtaining the slope or the shape of a voltage distribution of the obtained voltage values so as to estimate the external force's strength according to the slope or the shape.

18. The operation method according to claim 13, wherein the first and the second comparison voltages both are a power supply voltage.

19. The operation method according to claim 13, wherein the first and the second reference voltages both are a ground voltage.

20. The operation method according to claim 13, wherein the first comparison voltage and the second reference voltage both are a power supply voltage; and the second comparison voltage and the first reference voltages both are a ground voltage.

21. The operation method according to claim 13, further comprising a step of:
calculating the position on the first carbon nanotube layer according to the first output signals and the second output signals.

22. The operation method according to claim 13, further comprising a step of:
among the first output signals obtaining a largest voltage value of a first contact pad and calculating a coordinate relative to the second direction according to the position of the first contact pad corresponding to the first output signals on the first carbon nanotube layer; and among the second output signals obtaining a largest voltage value of a second contact pad and calculating the a coordinate relative to the first direction according to the position of the second contact pad corresponding to the second output signals on the first carbon nanotube layer.

23. A touch input apparatus, comprising:
a carbon nanotube layer of which carbon nanotubes each are disposed to be roughly parallel to a predetermined direction;
an inductive layer disposed above or under the carbon nanotube layer, and the carbon nanotube layer and the inductive layer having a predetermined distance there between;
a plurality of contact pads electrically connected to the carbon nanotube layer an edge thereof and arranged in a line perpendicular to the predetermined direction; and
a processing circuit electrically connected to the contact pads and the inductive layer, sequentially receives output signals from the contact pads, determines a position of an external force according to the output signals, determines a strength of the external force according to slopes or shapes of signal distributions of the output signals;
wherein, the output signals are voltage values of each one of the output signals.

24. The touch input apparatus according to claim 23, wherein the processing circuit configured to provide a comparison voltage to the inductive layer, sequentially operate the contact pads in a floating state according to a predetermined order and simultaneously electrically connect the contact pads not being operated in the floating state to a reference voltage so as to sequentially and read out the output signals of the contact pads operated in the floating state; and the processing circuit further being configured to calculate an external force's strength based on the anisotropic resistance characteristics and the output signals while the carbon nanotube layer (or, the inductive layer), being applied with the external force and thereby resulting in a corresponding forced point on the carbon nanotube layer (or, the inductive layer) to electrically contact to the inductive layer (or, the carbon nanotube layer).

25. The touch input apparatus according to claim 23, wherein the processing circuit is further configured to obtain a voltage value of the output signal of the contact pad corresponding to the forced point among the output signals, obtain a voltage value(s) of output signal of at least one contact pad arranged on the left or right of the contact pad corresponding to the forced point, and obtain the slope or the shape of a voltage distribution of the obtained voltage values of output signals so as to estimate the external force's strength according to the slope or the shape.

26. The touch input apparatus according to claim 24, wherein the comparison voltages both is a power supply voltage.

27. The touch input apparatus according to claim 23, wherein the processing circuit is further configured to calculate a plurality of external forces strengths according to the output signals while the carbon nanotube layer (or, the inductive layer) is being applied with the external forces and thereby resulting in corresponding forced points on the first carbon nanotube layer (or, the inductive layer) to electrically contact to the inductive layer (or, the carbon nanotube layer).

28. The touch input apparatus according to claim 23, wherein the processing circuit is further configured to calculate the forced point's position on the carbon nanotube layer (or, the inductive layer) according to the output signals.

29. The touch input apparatus according to claim 23, wherein the processing circuit is further configured to obtain a largest voltage value of the contact pads among the output signals and calculate the forced point's coordinate relative to a direction perpendicular to the predetermined direction according to a position of the contact pad corresponding to the largest voltage value on the carbon nanotube layer (or, the inductive layer).

* * * * *